US006785805B1

(12) United States Patent
House et al.

(10) Patent No.: US 6,785,805 B1
(45) Date of Patent: *Aug. 31, 2004

(54) NETWORK-BASED CONFIGURATION METHOD FOR SYSTEMS INTEGRATION IN TEST, MEASUREMENT, AND AUTOMATION ENVIRONMENTS

(75) Inventors: Richard W. House, Austin, TX (US); Cesar R. Gamez, Austin, TX (US); Francis E. Hinkle, Jr., Austin, TX (US)

(73) Assignee: VI Technology, Inc., Austin, TX (US)

( * ) Notice: Subject to any disclaimer, the term of this patent is extended or adjusted under 35 U.S.C. 154(b) by 607 days.

This patent is subject to a terminal disclaimer.

(21) Appl. No.: 09/702,087

(22) Filed: Oct. 30, 2000

Related U.S. Application Data

(60) Provisional application No. 60/223,689, filed on Aug. 8, 2000.

(51) Int. Cl.[7] .................................................. G06F 9/00
(52) U.S. Cl. ............................ 713/1; 713/2; 713/100; 700/90; 700/91; 700/92; 700/93; 700/94; 700/95; 700/96; 705/26; 705/27; 705/29
(58) Field of Search ........................ 713/1, 2, 100; 700/90–96; 705/26–27, 29

(56) References Cited

U.S. PATENT DOCUMENTS

| 5,241,464 A | 8/1993 | Greulich et al. ............ 364/401 |
| 5,307,261 A | 4/1994 | Maki et al. ................. 364/401 |
| 5,311,424 A | 5/1994 | Mukherjee et al. ......... 364/401 |
| 5,570,291 A | 10/1996 | Dudle et al. ........... 364/468.01 |
| 5,963,743 A | 10/1999 | Amberg et al. |
| 5,991,543 A | 11/1999 | Amberg et al. |
| 5,995,757 A | 11/1999 | Amberg et al. |
| 6,016,394 A | 1/2000 | Walker ....................... 395/701 |
| 6,018,765 A | 1/2000 | Durana et al. .............. 709/217 |
| 6,023,699 A | 2/2000 | Knoblock et al. ............ 707/10 |
| 6,038,597 A | 3/2000 | Van Wyngarden |
| 6,059,838 A | 5/2000 | Fraley et al. ................. 717/1 |
| 6,064,982 A | 5/2000 | Puri ............................ 705/27 |
| 6,096,094 A | 8/2000 | Kay et al. |
| 6,167,383 A | 12/2000 | Henson ....................... 705/26 |
| 6,381,556 B1 | 4/2002 | Kazemi et al. ............ 702/182 |
| 6,535,294 B1 | 3/2003 | Arledge, Jr. et al. ....... 358/1.15 |
| 6,598,223 B1 | 7/2003 | Vrhel, Jr. et al. .......... 717/174 |
| 2002/0161656 A1 | 10/2002 | Mongilio ..................... 705/26 |

OTHER PUBLICATIONS

Hubbard, Holly, "IBM eyes build–to–order software", Mar. 28, 1994; *Computer Reseller News*.

EE News, "PXI Systems Can Be Configured and Ordered Over the Web", http://www.evaluationengineering.com/news/062899natinst.htm; Jun. 1999.

EE News, In the News, http://www.evaluationengineering.com; Aug. 1999.

Richard House et al., "Network–Based Configuration Method for Software Development In Test, Measurement and Automation Environments", Ser. No. 09/702,088; Filed Oct. 30, 2000.

Richard House et al., "Network–Based Configuration Method for Integrated Test Systems for Test, Measurement and Automation Environments", Ser. No. 09/702,104; Filed Oct. 30, 2000.

*Primary Examiner*—Jeffrey Gaffin
*Assistant Examiner*—Nitin Patel
(74) *Attorney, Agent, or Firm*—O'Keefe, Egan & Peterman, LLP

(57) ABSTRACT

Network-based methods and systems are disclosed for configuring and building systems and providing systems integration for the test, automation and measurement environment. The methods include internet or intranet-based applications that configure and quote a system or system integration project in response to selection of system features, system components and/or system configurations by a network user. The methods may be implemented as part of a build-to-order internet application.

45 Claims, 11 Drawing Sheets

NETWORK-BASED CONFIGURATION METHOD FOR SYSTEMS INTEGRATION IN TEST, MEASUREMENT, AND AUTOMATION ENVIRONMENTS

RELATED APPLICATIONS

The present application claims priority on co-pending United States provisional patent application Ser. No. 60/223,689 filed on Aug. 8, 2000, the entire text and all contents of which is hereby expressly incorporated by reference in its entirety.

BACKGROUND OF THE INVENTION

1. Field of the Invention

This invention relates generally to network-based methods for configuring and building integrated systems, such as integrated test, automation, and/or measurement systems. The methods may be internet or intranet-based applications that configure and price an integrated system in response to selection of system features and/or system configurations by a network user. The methods may be implemented as part of a build-to-order internet application.

2. Description of the Related Art

Integrated systems are widely used in industry to fulfill a number of needs. For example, integrated systems are used in the test, measurement and automation industries to automate research, design, test, and measure physical and electrical signals. These types of integrated systems may be referred to collectively as "integrated TMA systems." During the research, development, manufacturing, and testing of products, a variety of scientific instrumentation and sensors are used for measuring and generating a wide range of physical signals including, but not limited to, temperature, pressure, power signals, RF signals, and biomedical signals. Thus, as used herein, the terms "measurement" and "generation" refer to measurement and generation of both high and low frequency bandwidth signals including, for example, measurement and generation of relatively higher frequency RF signals and relatively lower frequency temperature signals.

Scientific instruments used for these measurements and signal generation may include equipment such as oscilloscopes, multimeters, waveform generators, and data acquisition instruments. To automate signal measurement and generation, a controller (e.g., a personal computer or workstation) may be interfaced to such scientific instruments to control these instruments with custom written software. The process of mounting, cabling, and interfacing these instruments, test racks, components, and sensors together, and developing and installing software to control the system so that the system can perform automated test and measurement is known as "systems integration."

It is a common practice for corporations to outsource system integration of test, measurement, and automation systems to companies that specialize in system integration, known as systems integrators. This outsourcing process generally requires a systems integrator to become familiar with the needs of the outsourcing company. After collecting and analyzing these needs, the systems integrator manually generates and delivers a price quote and project details for the development effort to the outsourcing company. If the outsourcing company decides to contract the systems integration with the systems integrator, the outsourcing company manually informs the system integrator that they will award them the contract based on their written proposal and then sets up payment and delivery terms. The systems integrator then acquires components for the system from various component vendors and assembles the integrated system. This outsourcing process typically requires several months from the initial decision to outsource a systems integration project to the delivery of the assemble integrated system. The assembled price of an outsourced integrated system typically must cover the manpower costs associated with the bidding and component procurement process.

The internet is used for searching, selecting, and ordering components used in test, measurement, and automation systems. Several component vendors offer online selection tools that assist a user in identifying individual components available from the specific component vendor to fit the user's specified application (e.g., measurement function, number of channels, etc.). Other third parties offer online selection tools to assist a user in choosing components from multiple component vendors. A few component vendors use the internet to offer pre-configured systems that the user cannot change, or to provide price quotes for selected parts or components. Still other companies offer the ability to get online quotes for built-to-order printed circuit boards that may be used in these systems. For example, a user may enter specifications for a printed circuit board (e.g., number of holes, number of traces on the board, etc.), and obtain an online quote for the cost of a printed circuit board meeting these specifications.

Development of custom software drivers for use with integrated systems and/or instrument hardware typically requires a customer to write requests for quotes, forward these requests to software developers, and wait for a response. This process is typically time-consuming and may be repeated several times before the customer finds the right software solution.

In the personal computer industry, several computer vendors offer the ability for the customer to place an online order for a personal computer that is based on the customer's computing needs. The customer first selects components for a personal computer ("PC") through a web browser. A server then calculates the price for the PC based on the entered selections. If the customer decides to order the system, the PC vendor then builds the PC based on the customer's entered specifications, and ships the computer to the customer.

SUMMARY OF THE INVENTION

Disclosed herein are network-based configuration methods for systems integration over a network such as the Internet, for test, measurement, and automation (TMA) environments. In one embodiment, the present invention is a method for providing integrated systems for test, measurement and automation (TMA) environments, including providing a plurality of selectable configuration options to a user through a network where the selectable configuration options representing features for a TMA system, receiving information representing configuration options selected by a user, assembling a plurality of TMA components to produce a TMA system that satisfies the user-selected configuration options, providing systems integration for the TMA system to produce an integrated TMA system, and fulfilling an order for the user-configured TMA system with the integrated TMA system. In addition, the TMA components comprise hardware components, software components, or a combination of both. And the plurality of TMA components comprise one or more third party TMA hardware components, one or more third party TMA-related software components, or a combination hereof. Still further, the network may be, for example, the Internet.

In more detailed embodiments, the method may further include generating a price for the TMA system based upon the user-selected configuration options prior to the assembling step and that price may be automatically calculated. Furthermore, the price may be generated using an adaptive formula, the adaptive formula being capable of adapting itself based on the user-selected configuration options. Also, the method may further include tracking the status of assembly and fulfillment, and making the status available to the user. And this tracking status may be automatically provided. Still further, the assembly and fulfillment may be performed by two or more respective departments in at least first and second successive steps, with automatic status notification between a first department responsible for the first step following receipt of the order and a second department responsible for the second step of the completion. In addition, the method may determine an estimated completion date for the integrated TMA system based on the user-selected configuration options and provide estimated completion date to the user. In addition, the estimated completion date may be determined using an adaptive formula, the adaptive formula being capable of adapting itself based on historical completion times for previously assembled and fulfilled integrated TMA systems.

In still further detailed embodiments, the method may include generating a graphical depiction of the integrated TMA system based on the user-selected configuration options, and providing the graphical depiction to the user. More particularly, at least a front view and a back view for the integrated TMA system may be viewable by the user. Still further, the graphical depiction may be rotated around an axis by a user, if desired, and the axis may be selectable by the user. In addition, a graphical interface may be provided to allow the user to configure the integrated TMA system where the graphical interface has a first area for displaying a graphical representation of an integrated TMA system and a second area for displaying the selectable configuration options. Within this graphical interface, at least one individual option may be capable of user selection from the second area by positioning and clicking of a mouse pointer over the individual option and dragging the individual option into the first area of the graphical interface. Then the resulting depiction may be dynamically generated and updated in the first area of the graphical interface in response to the user selection of selectable configuration options.

In another respect, the present invention is a method for providing through a network cost information for integrated systems within test, measurement and automation (TMA) environments, including providing a plurality of selectable configuration options to a user through a network where the selectable configuration options representing features for a TMA system, receiving information representing configuration options selected by a user, identifying a plurality of TMA components for a TMA system that would satisfy the user-selected configuration options, determining systems integration that would be required to satisfy the user selected configuration options, generating a price for the integrated TMA system where the price including a cost for the plurality of TMA components and a cost for the systems integration required to produce the integrated TMA system, and providing the price to the user through the network. Still further, the method may include receiving an order for the integrated TMA system and fulfilling the order with an integrated TMA system configured and built to meet the user-selected configuration options. In addition, the plurality of TMA components may include one or more third party hardware components, one or more third party TMA-related software components, or a combination thereof.

In another respect, disclosed is method for ordering a system integrated for test, measurement, and/or automation purposes in which the integrated system includes a plurality of interconnected hardware and software components. The components may include one or more hardware components available from a third party, and/or may include one or more TMA-related software components available from a third party. The method may be operated under control of a client system, and may include the step of using a server to display selectable options for a test, measurement, and/or automation system to an online user. In response to receiving selected requirements (e.g., features, components, etc.) of the system from the online user, the server may provide a price quote for the integrated system to the online user by retrieving stored information on materials cost, engineering services costs, and business model information; calculating a cost for the system based on the stored information; and generating a price quote for the system-based on the calculated cost. In response to receiving an order on the server to purchase the quoted system, the order may be fulfilled by assembling, testing, documenting, and delivering the system. Advantageously, the cost of the integrated system may be calculated immediately and automatically.

As so desired, an integrated system may be made up of up of off-the-shelf hardware components (in one embodiment, available from one or more third parties or multiple vendors), some custom-designed hardware components, off-the-shelf software components (in one embodiment, TMA-related software available from one or more third parties or multiple vendors), and/or custom designed software. Virtually any aspect of an integrated system may be specified, price-quoted, ordered and assembled using this method including, but not limited to, instrumentation integration, sensors integration, software integration, PC controller integration, system housing integration, integration of other instrumentation assemblies and sub assemblies.

The method may include provision for real time determination of the status of the integrated system order by an online user or an internal department. The method may include the dynamic creation of documentation for the ordered integrated system, and/or dynamic creation of an automated test software sequence, test plan, or program for the system. The method may also include provision for allowing entry of information relating to requested engineering services, and the calculation of the cost of same for inclusion in the integrated system price quote. In one embodiment, systems integration may involve custom assembly of off-the-shelf components (which may be for example, hardware available from one or more third parties and/or TMA-related software available from one or more third parties), such as commercially available instrumentation assemblies and sub-assemblies (e.g., test rack, power supply, etc.) and pre-built sub-assemblies and assemblies that may not be commercially available (e.g., power supply drawers, side panel automated off switches, etc.). In other cases, engineering services may be specified or implicated by an online user and the cost of such included in the integrated system price quote. Such engineering services may include any non-standard integrated system design which requires engineering of hardware and/or software, such as custom instrument drivers. Specific examples of engineering services include, but are not limited to, custom electronic circuit design, printed circuit board design, layout, and fabrication; custom software development; and engineering design of hardware and software components integration into a working assembly.

In another respect, disclosed is a method for ordering systems integration for a test, measurement and automation (TMA) environment, including: (A) providing a plurality of selectable configuration options to a user through a network, the selectable configuration options representing features of a TMA system; (B) receiving information representing configuration options selected by a user; and (C) fulfilling an order for the user-configured TMA system by building a TMA system to satisfy the user-selected configuration options. The network may be, for example, the Internet. The selectable configuration options may include at least one of hardware components, software components, software development services, or a combination thereof. The fulfilling step may include system integration of TMA system components, and/or the order may be fulfilled by building a TMA system including one or more third party hardware components, one or more third party TMA-related software components, or a combination thereof.

The method may further include generating a cost associated with the configured TMA system based upon the received information and providing information concerning the cost to the configuring user prior to the fulfilling step. In this regard, the generating step may include automatically calculating the cost based upon the selected configuration options, calculation of system integration requirements, calculation of an engineering services component, and/or calculation based upon externally available components and internally available components. The method may further include tracking status within the fulfilling step and making information available to the configuring user concerning the tracking status. In addition, the method may include dynamic creation of documentation for the configured TMA system, dynamic creation of an automated test software sequence for the configured TMA system, dynamic creation of a test plan for the configured TMA system, and/or dynamic creation of a software program for the configured TMA system.

In another respect, disclosed is a method for obtaining information through a network for systems integration within a test, measurement and automation (TMA) environment, including: (A) utilizing a network user interface to access configuration information on a server system, the configuration information providing a plurality of selectable configuration options representing features of a TMA system; and (B) receiving cost information representative of a configured integrated TMA system through the network user interface. The method may further include (C) ordering the configured TMA system, and (D) receiving a TMA system configured and built to satisfy the user-selected configuration options. The network may be, for example, the Internet. The selectable configuration options may include at least one of hardware components, software components, software development services, or a combination thereof. The configured integrated TMA system may be a TMA system including one or more third party hardware components, one or more third party TMA-related software components, or a combination thereof. The method may further include accessing Order Processing status through the network user interface.

In yet another respect, disclosed is a method of configuring an integrated TMA system over a network, including: (A) listing two or more user-selectable TMA system options; (B) configuring the TMA system by selecting the identity of two or more individual system components based on user-selected TMA system information received from a user; (C) determining a price for the integrated TMA system based on the user-selected TMA system information; and (D) providing the integrated TMA system price to the user. The network may be, for example, the Internet. The integrated TMA system may include one or more third party hardware components, one or more third party TMA-related software components, or a combination thereof. In one embodiment, all of the components (software and/or hardware components) may be third party components from third party vendors. The identity of the two or more individual system components may be determined automatically. The method may further include assembling and shipping the configured integrated TMA system to the user in response to an order from the user, and/or may further include automatically tracking the status of the assembly and the shipping, and making the status available to the user. The assembly and shipping may be performed by two or more respective departments in at least first and second successive steps, and the method may further include automatically notifying a first department responsible for the first step following receipt of the order; and automatically notifying a second department responsible for the second step of the completion of the first step or of the estimated completion time for the first step. The method may further include maintaining a database of component specific information, and at least one of the steps of configuring or determining may include retrieving component specific information from the database.

In one embodiment of the method, the integrated TMA system price may be determined based on the user-selected TMA system information and one or more cost factors including at least one of a cost of materials to be used to assemble the integrated TMA system, a cost of software used to be used to assemble the integrated TMA system, a cost for assembly of the individual system components to form the integrated TMA system, a cost for engineering services related to configuration or assembly of the integrated TMA system, or a combination thereof. For example, the integrated TMA system price may be optionally determined using an adaptive formula, the adaptive formula capable of adapting itself based on entered data of actual integrated system cost for assembly of previously ordered integrated TMA systems prior to calculating the integrated TMA system price. The integrated TMA system price may be determined automatically.

In the practice of the method, the user-selectable TMA system options may include, for example, one or more pre-determined TMA system configurations, one or more pre-determined TMA system components, one or more user-definable TMA components, one or more user-definable TMA system features, or a combination thereof. The user-selectable TMA system options may include at least one hardware component option, at least one TMA system feature option, at least one sub-system configuration option, or a combination thereof. In one embodiment, the individual system components may include at least one custom-engineered hardware component, and/or at least one custom-engineered software component. In another embodiment, the individual system components may include at least one hardware component and at least one software component.

The method may further include determining a delivery time for the integrated TMA system based on the user-selected TMA system information and one or more delivery time factors; and providing the integrated TMA system delivery time to the user. In this regard, the integrated TMA system delivery time may be optionally determined using an adaptive formula, the adaptive formula capable of adapting itself based on entered data of actual integrated system delivery time of previously assembled and delivered integrated TMA systems prior to calculating the integrated TMA system delivery time.

The method may also optionally further include generating a graphical depiction of the integrated TMA system based on the user-selected TMA system information, and providing the graphical depiction to the user. In one such embodiment, the method may further include providing a graphical interface to allow the user to define the user-selected TMA system information, the graphical interface having a first area for displaying a graphical representation of an integrated system, and a second area for displaying the user-selectable TMA system options. In this embodiment, individual options of the user-selectable TMA system options are capable of user selection from the second area by positioning and clicking of a mouse pointer over an individual option and dragging the individual option into the first area of the graphical interface. Following such user selection, the method may include dynamically generating and updating the depiction of the integrated TMA system in the first area of the graphical interface in response to the user selection of individual user-selectable TMA system options.

The method may further include automatically generating integrated system documentation for the integrated TMA system based on the user-selected TMA system information. In one embodiment, the method may further include automatically and dynamically generating integrated system drawings for the integrated TMA system based on the user-selected TMA system information. In another embodiment, the method may further include automatically generating a test program for the integrated TMA system based on the user-selected TMA system information, and testing the integrated TMA system after assembly. In yet another embodiment, the method may further include automatically generating assembly information for use in assembly of the integrated TMA system. The assembly information may be based on the user-selected TMA system information, and may include at least one of a bill of materials, assembly drawings, electrical interconnect drawings, assembly instructions, or a combination thereof. The method may further include automatically transmitting the assembly information to a manufacturing department for use in assembly of the integrated TMA system.

DETAILED DESCRIPTION OF SPECIFIC EMBODIMENTS

Figure 1A:
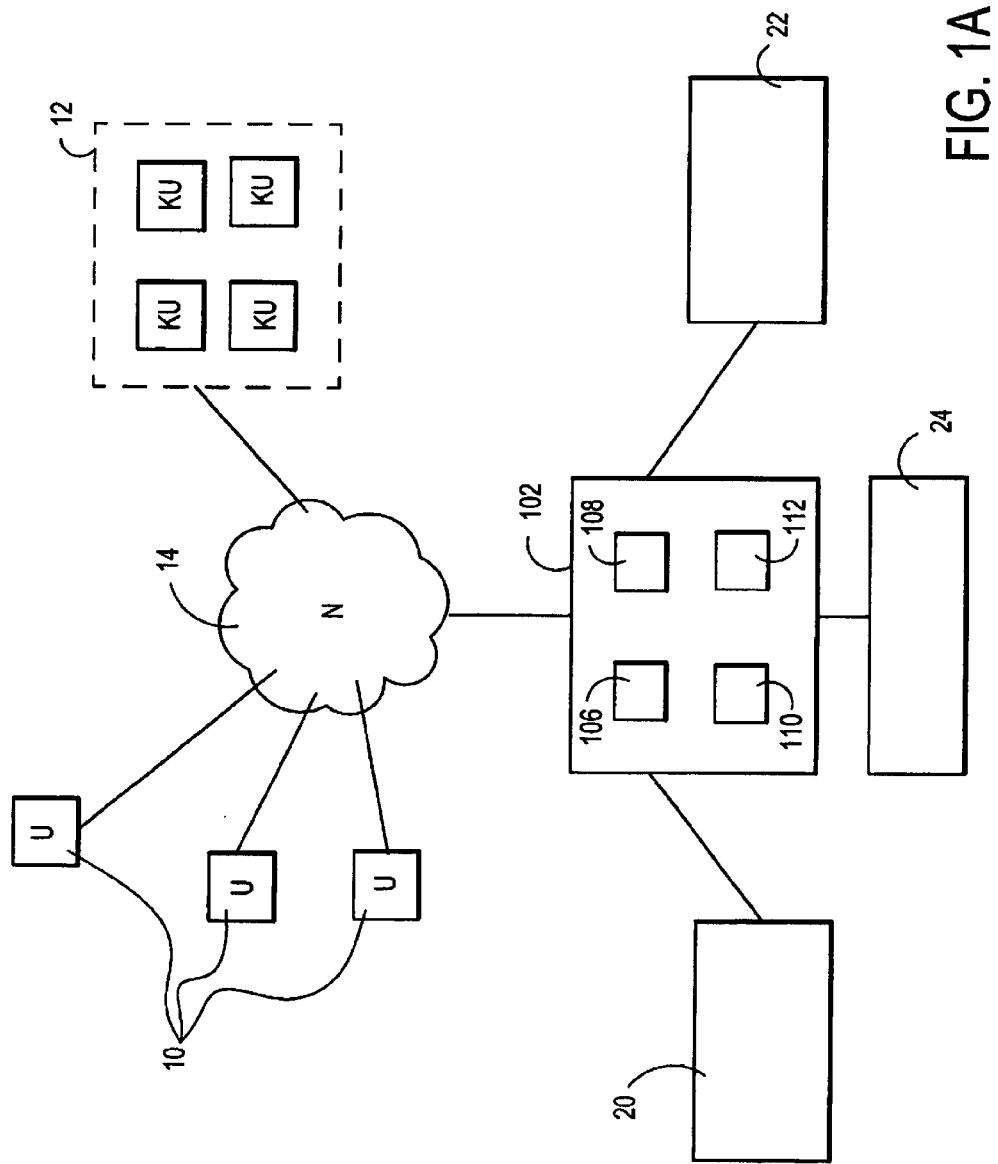
FIG. 1A is a simplified block diagram illustrating one embodiment of the disclosed network-based systems and methods for ordering and building custom integrated systems over the internet.

As previously described, existing online systems only allow a user to search, get quotes and order individual components for eventual assembly into an integrated TMA system, or only offer pre-configured integrated TMA systems. In contrast, the disclosed methods and systems advantageously allow a user to enter their system requirements and/or perform online searches for components, as well as to online custom configure and order an assembled integrated TMA system, including one or more hardware components and/or TMA-related software components from one or more third party vendors if so desired. An online user may configure an integrated TMA system by specifying components and/or system features, obtain immediate online quotes on an assembled and delivered integrated TMA system configured to meet these custom requirements, place an online order for the assembled system, track the status during development, and then later directly receive the assembled integrated TMA system, fully documented and tested.

Advantageously, the cost of assembly of the custom configured system may be included in a price quote. In addition, the disclosed online systems may offer engineering services in addition to systems integration, and may also incorporate the cost of these services into the online price quote. In this regard, engineering services may involve anything from the level of integration of pre-existing hardware and/or software components with custom code and/or custom hardware, to the level of writing software code and/or printed circuit board design. In addition to offering generally available hardware and/or software options to any given consumer or web-user, particular preferences for software and/or hardware may be offered to specific users on an individual user-by-user or group-by-group basis. Such preferences may include a limited (or expanded) selection of hardware and/or software component options, tailored to the individual user's request. Access to these preferences may be limited to the individual user, for example, by network password.

Thus, in one embodiment a method is provided for online ordering and configuration of integrated systems that advantageously allows the complexity of the configuration, engineering, and/or assembly required for a customized integrated system to be reflected in an automatically generated online price quote. This ability to automatically generate quotes for custom integrated systems greatly facilitates the customization and purchase of such systems, by reducing both the user time and vendor manpower associated with configuring and pricing such systems, and by allowing a user to vary component and system requirements to determine cost and/or delivery time sensitivity, where delivery date information is determined and provided. Since a customer or online user may specify system requirements or features, rather than the identity of individual components themselves, the configuration process is further simplified from the user's perspective.

In one embodiment, the disclosed methods and systems may be implemented to provide a Web-based build-to-order business model in the test, measurement and automation systems areas ("TMA"), providing end users with configured and assembled systems that are state of the art. Advantageously, customized integrated systems may be tailor-produced based on specifications input online by a user, and using standard TMA components available from known TMA component manufacturers. Thus, an online user may order an integrated TMA system that takes advantage of, for example, the high accuracy, sampling rate, and dynamic range of the latest state-of-the-art TMA components, but that is configured and assembled to the needs of that specific user. In this way, online users may configure and purchase state-of-the-art integrated systems that meet specific needs without paying for unneeded features or components. To facilitate system configuration, a user may initially select a category of equipment type or system type from a list of categories. Following this selection, a list of selectable features and/or components for the selected equipment or system type may be selected from to configure a custom system. The online user may then price the system and proceed to order it if desired.

Using the disclosed methods and system, an online user may thus configure and order an integrated TMA system over a network without personally having to locate or purchase the individual components, integrate these components, and then test the system to make sure that the components work together and meet the user's requirements. Advantages to a system integrator (e.g., operator of the a website and systems integration assembly and test facility), include a substantial reduction in the time required to assemble, generate a quote, modify a quote and test an integrated system specified by a user as compared to conventional system integration practices. This is particularly advantageous for the configuration of integrated TMA systems where one or more third party hardware components and/or third party TMA-related software components from one or more third party vendors are selected for inclusion in an integrated system. As used herein with regard to hardware or software components, the term "third party" refers to a component manufactured and/or supplied by an entity (e.g., corporation, company, or other supplier or vendor) other than the online user or the system integrator. "TMA-related" software components are those software components specifically designed for use with, and/or that are exclusively capable of use with, TMA hardware components and/or integrated systems including, but not limited to, instrument drivers. Examples of non TMA-related software components include general application software for PC or other computer use, such as operating systems, word processing and spreadsheet programs, etc. In one embodiment, all of the components (hardware and/or software) of a configured and integrated TMA system may be third party components from third party vendors. In another embodiment, third party components, user-supplied components, and/or system integrator-supplied components may be combined as desired to configure an integrated system.

In the TMA equipment area, component and tool suppliers innovate standard components on a short-cycle basis. Thus, by using standardized equipment, it is possible to capitalize on innovations in the systems and manufacturing side and to couple these innovations with state-of-the art components to achieve superior and cost-effective components and integrated systems. Further advantageously, a wide range of number and types of component and system options may be offered to a user or end user. For example, it may be possible to allow the full specification of all parameters of a TMA system equipment component or an automated TMA system, including parameters such as signal types (e.g., DC voltage, temperature, pressure, vibration, sound, RF, digital, timing, motion control), channel count, resolution, sampling rate, connector type (e.g., BNC, DSUB, Circular Plastic Connectors, Screw Terminals), storage capacity, bus interface (e.g., Ethernet, Device Net, IEEE-488, RS-232), software command interface, performance requirements, etc. In addition, multi-vendor hardware and software component conflicts (driver conflicts, signal level conflicts, etc.) may be advantageously resolved for the end user or users during assembly of the integrated TMA system (e.g., a test rack system, telecommunications test system, semiconductor test system, power supply test system, automotive test system, etc.). Successful component integration and performance (e.g., such as speed capability of hard disk in relation to incoming data rates, signal quality, etc.) may also be assured at the same time. If desired, test-program software may be advantageously written for the user-configured integrated system at the time of configuration and assembly, and the system tested prior to shipment to the user/customer. Such test program software may be automatically or manually generated and may include, for example, automated test software sequence programs. Also possible, is the automatic or manual generation of test plans, the steps of which may be followed to manually test an integrated system.

In one exemplary embodiment of an online build-to-order system, the requirements of an integrated TMA system are entered by a user through a client software program such as a web browsers, and received by a server. The server analyzes the requirements and calculates a cost for the integrated system using a formula or algorithm and based on parameters such as materials cost, assembly time/cost and/or engineering services time, and business models. As part of this analysis, the server may select individual components to meet the user-defined requirements or features of the system. In one embodiment, this automatic selection may be based, for example, on empirical information stored in a database that contains a correlation of appropriate component selections based on particular user-defined requirements or features. If desired, user-defined requirements or features that do not correspond to existing component database information may be accepted and automatically routed to appropriate personnel or department for a "first time" selection of components to configure the desired user-defined integrated system. This component selection information may then be added to the database in a "feedback" manner, so that in the future components may be automatically selected by the server using the database information in combination with a user-definition of similar requirements or features.

In this same embodiment, the server generates a formal price quote for the assembled integrated system, and sends the quote to the client. The server may also optionally generate and provide an estimated delivery date for the system based on such factors as material availability, number of other orders, complexity of the integrated system, etc. The user may save the quote for later retrieval, or may immediately place the order for the integrated system. Placed orders for systems that require custom designed hardware or software components are first sent to appropriate personnel or department for necessary engineering and/or configuration services, prior to being sent to appropriate personnel or department for manufacture and/or assembly. Placed orders that can be assembled from pre-manufactured hardware and software are sent directly to manufacturing/assembly personnel or department for systems integration and assembly. All orders are then sent to the appropriate testing area prior to shipping. Advantageously, online users may check or monitor the status of a placed order as it progress through all stages of the online build-to-order system, and the system automatically notifies each stage of the system (i.e., engineering services, assembly/manufacture, testing, shipping, etc.) of the current status of the order.

Figure 5:
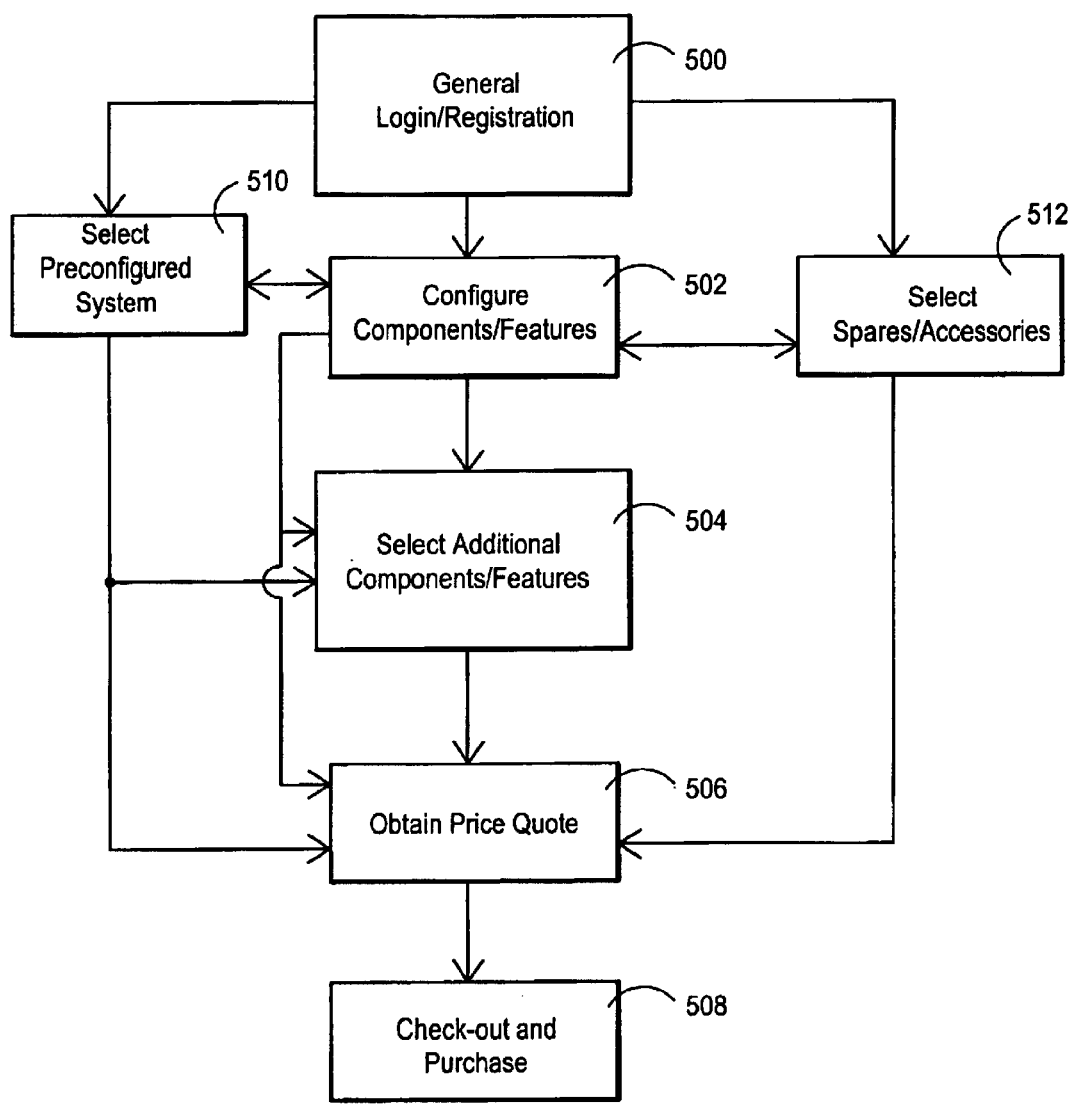
FIG. 5 is a simplified block diagram illustrating registration, configuration and purchase of a custom integrated system according to one embodiment of the disclosed network-based systems and methods.
Figure 6:
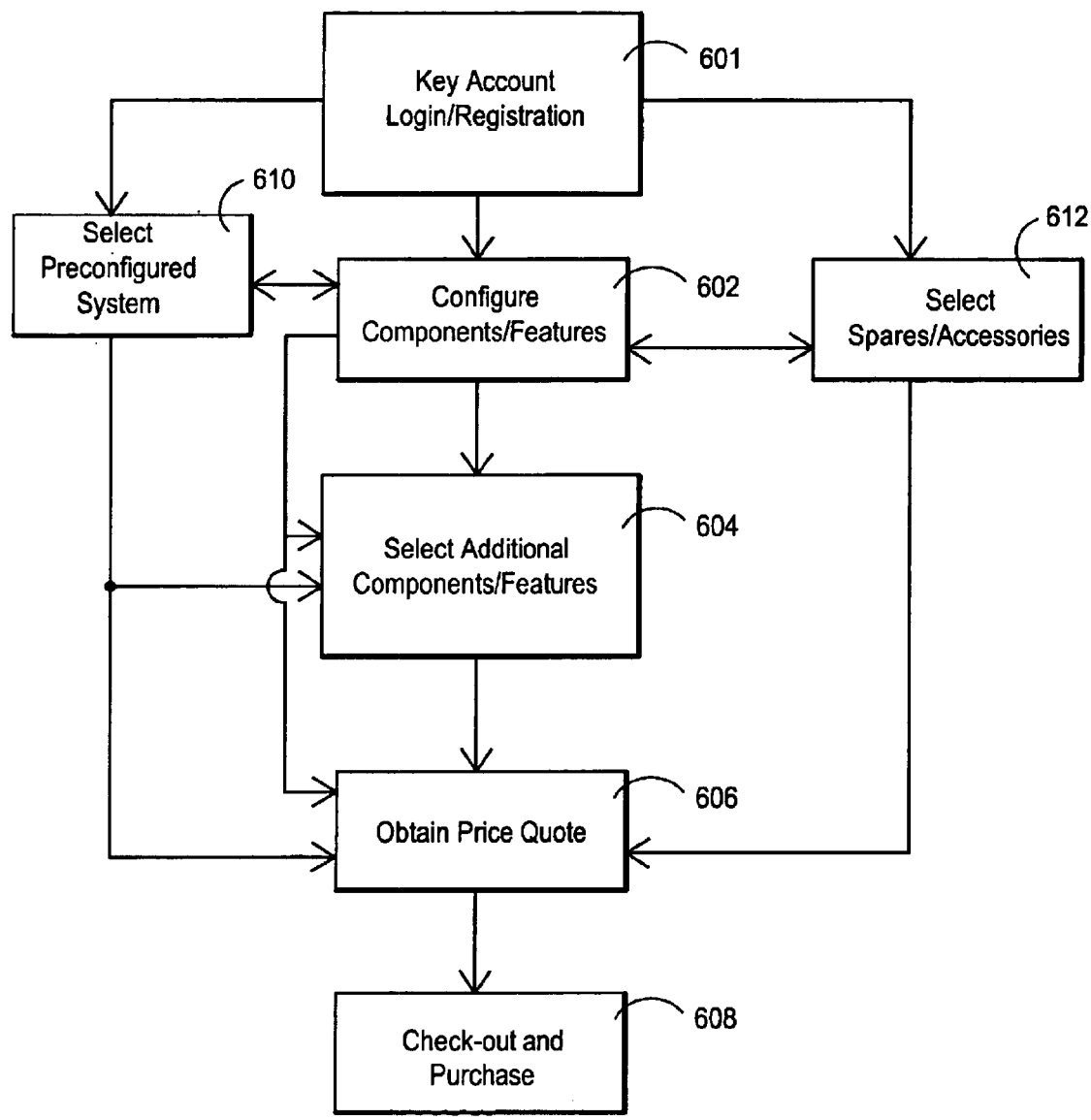
FIG. 6 is a simplified block diagram illustrating registration, configuration and purchase of a custom integrated system according to one embodiment of the disclosed network-based systems and methods.
Figure 7:
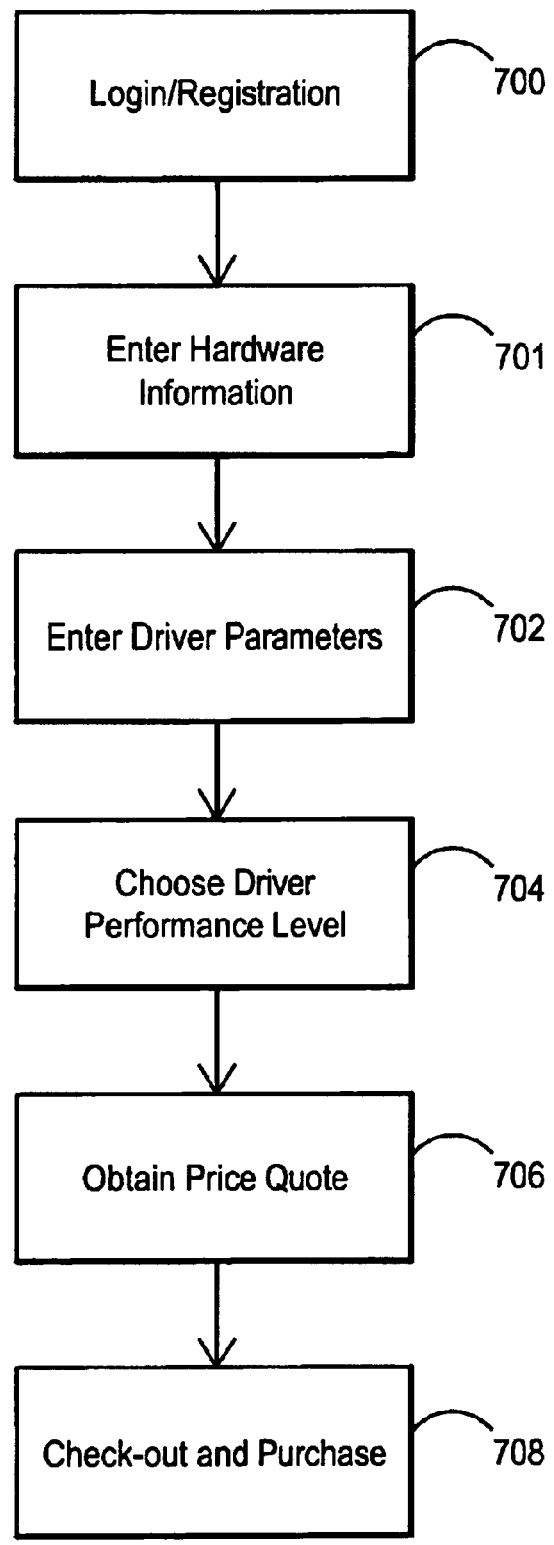
FIG. 7 is a simplified block diagram illustrating registration, configuration and purchase of a custom integrated driver system according to one embodiment of the disclosed network-based-systems and methods.
Figure 8:
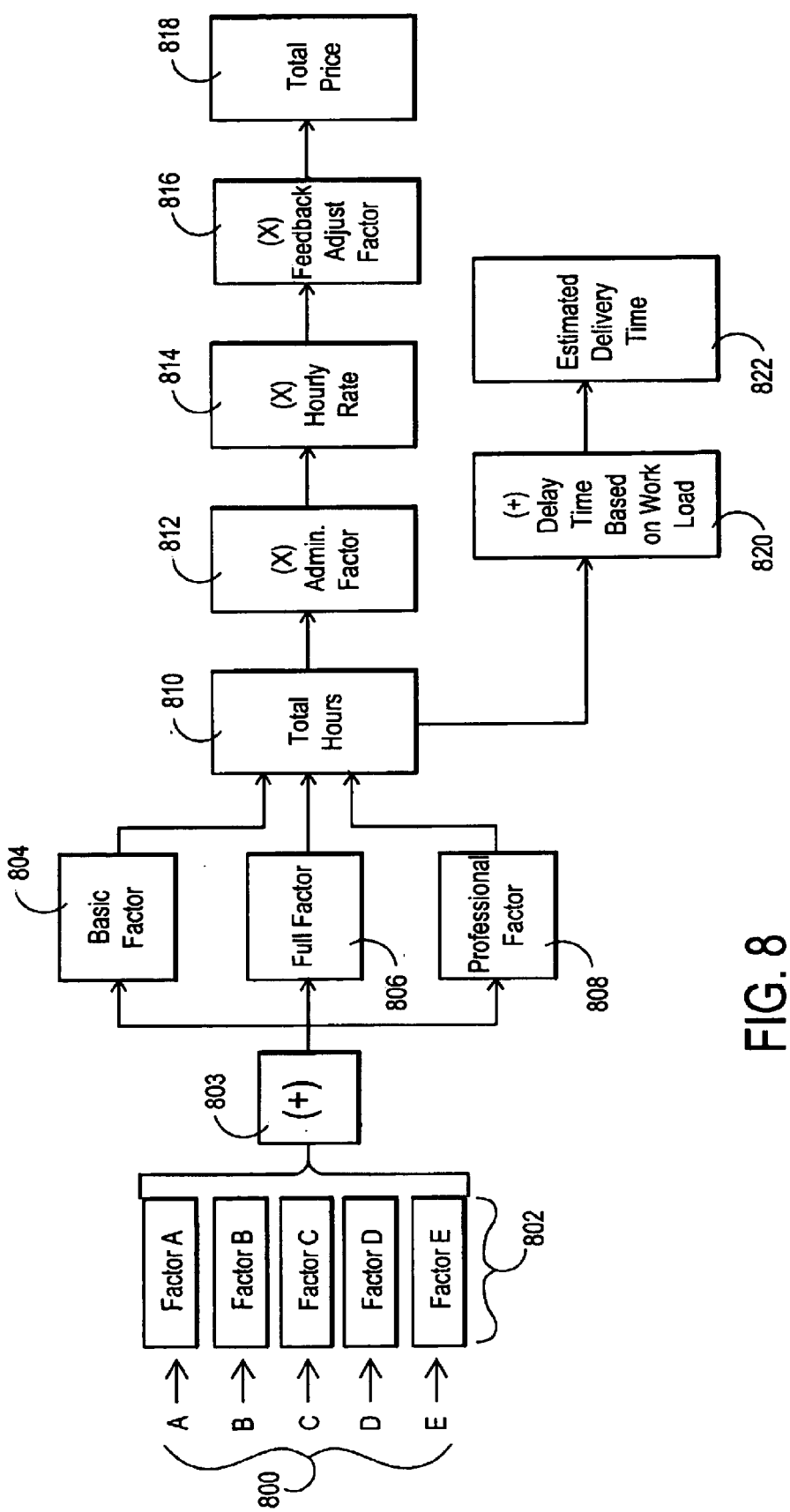
FIG. 8 is a simplified block diagram illustrating calculation of an engineering service price quote and estimated engineering service delivery time according to one embodiment of the disclosed network-based systems and methods.
Figure 9A:
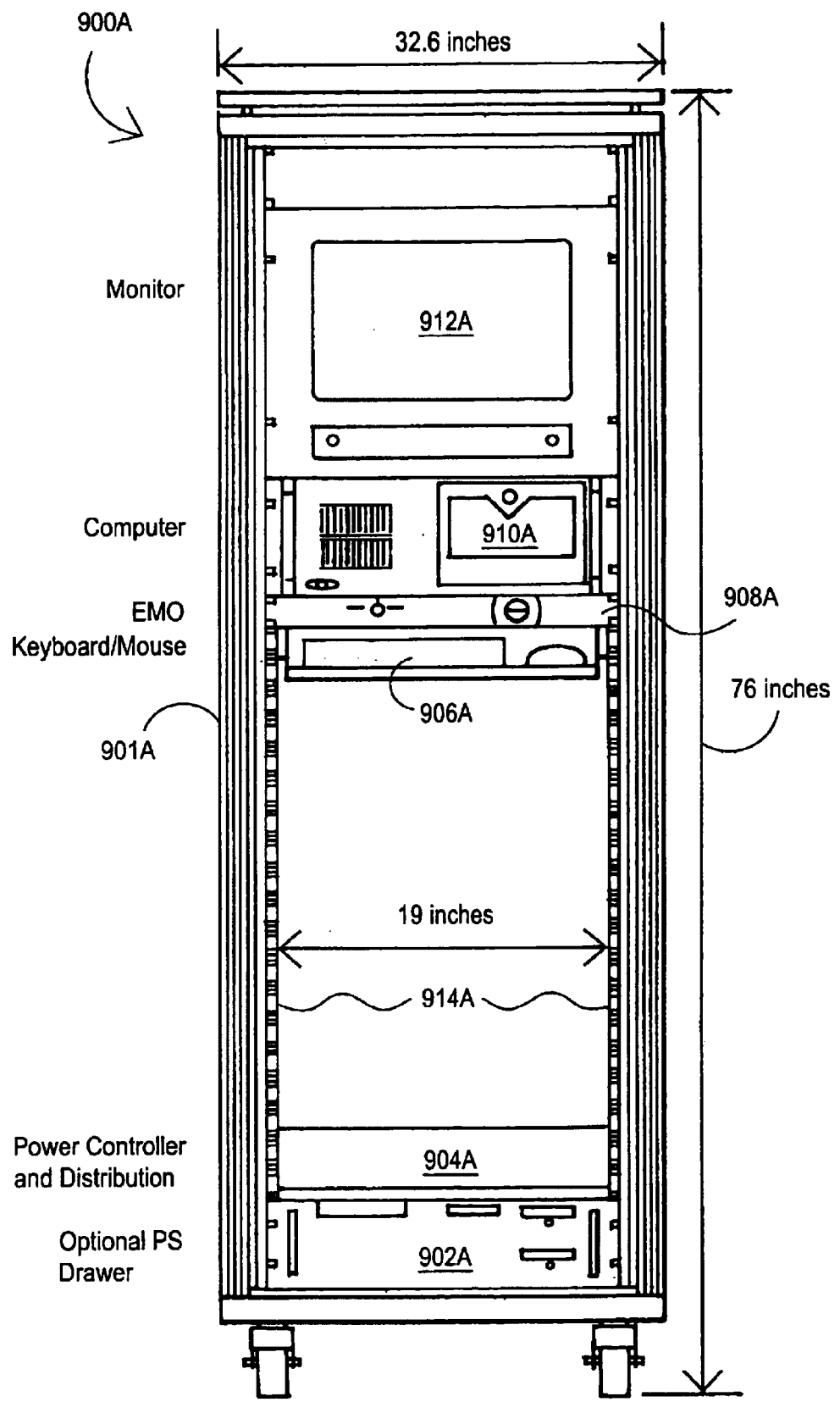
FIGS. 9A and 9B provide is a front view and a back view, respectively, for a configured test rack system, according to the present invention.
Figure 9B:
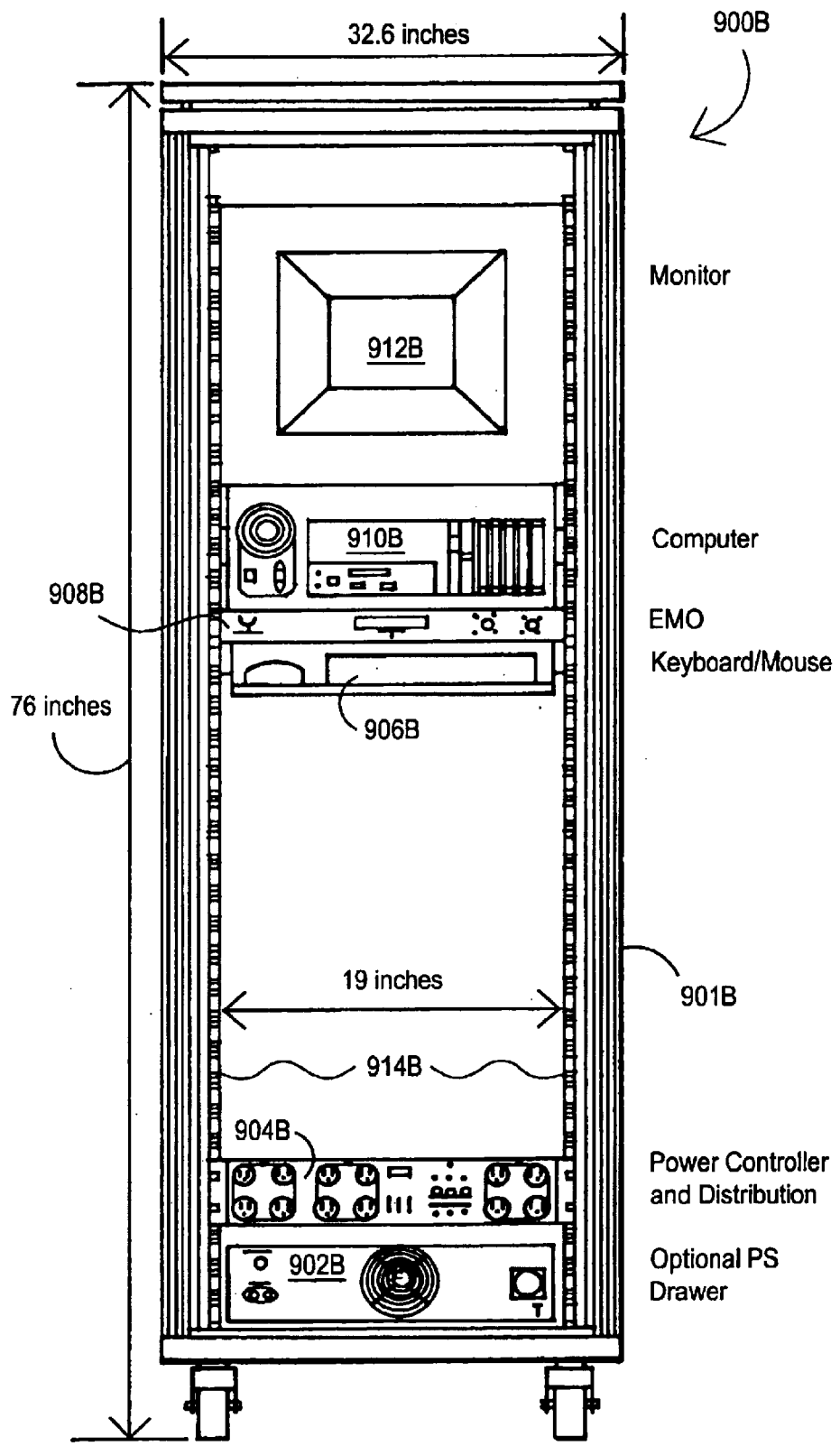

Now referring to the drawings, the embodiments of the present invention will be discussed in more detail. FIG. 1A, FIG. 1B, FIG. 2, FIG. 3 and FIG. 4 provide block diagrams for embodiments of the interface methodology for the present invention that allows for configuration, quotation, ordering and fulfillment of systems and systems integration. FIG. 5 and FIG. 6 provide block flow diagrams for an implementation of the present invention directed to configurable test rack systems. FIGS. 9A and 9B provide a front view and back view, respectively, for a configured test rack system. FIG. 7 provides a block flow diagram for an implementation of the present invention directed to quotations for software driver development services. FIG. 8 provides a block diagram illustrating calculation of an engineering service price quote and estimated engineering service completion date or delivery time according to one embodiment of the disclosed network-based systems and methods.

Looking first to FIG. 1A, a simplified block diagram is shown of one embodiment of the disclosed network-based systems and methods for ordering and building custom integrated systems over a network 14. General users 10 and a group of Key users 12 interface and access a server 102 through network 14. General users 10 represent individual users, such as members of the general public. Key users 12 represent particular users, or groups of users, to which a customized set of system configuration and/or engineering services options may be offered as described further herein. As shown, server 102 includes server functionalities 106, 108, 110 and 112, which will be described in further detail below. Server 102 also includes or has access to Administration utility 20, component database 22, and order fulfillment departments 24, each of which is also described in further detail herein.

Figure 1B:
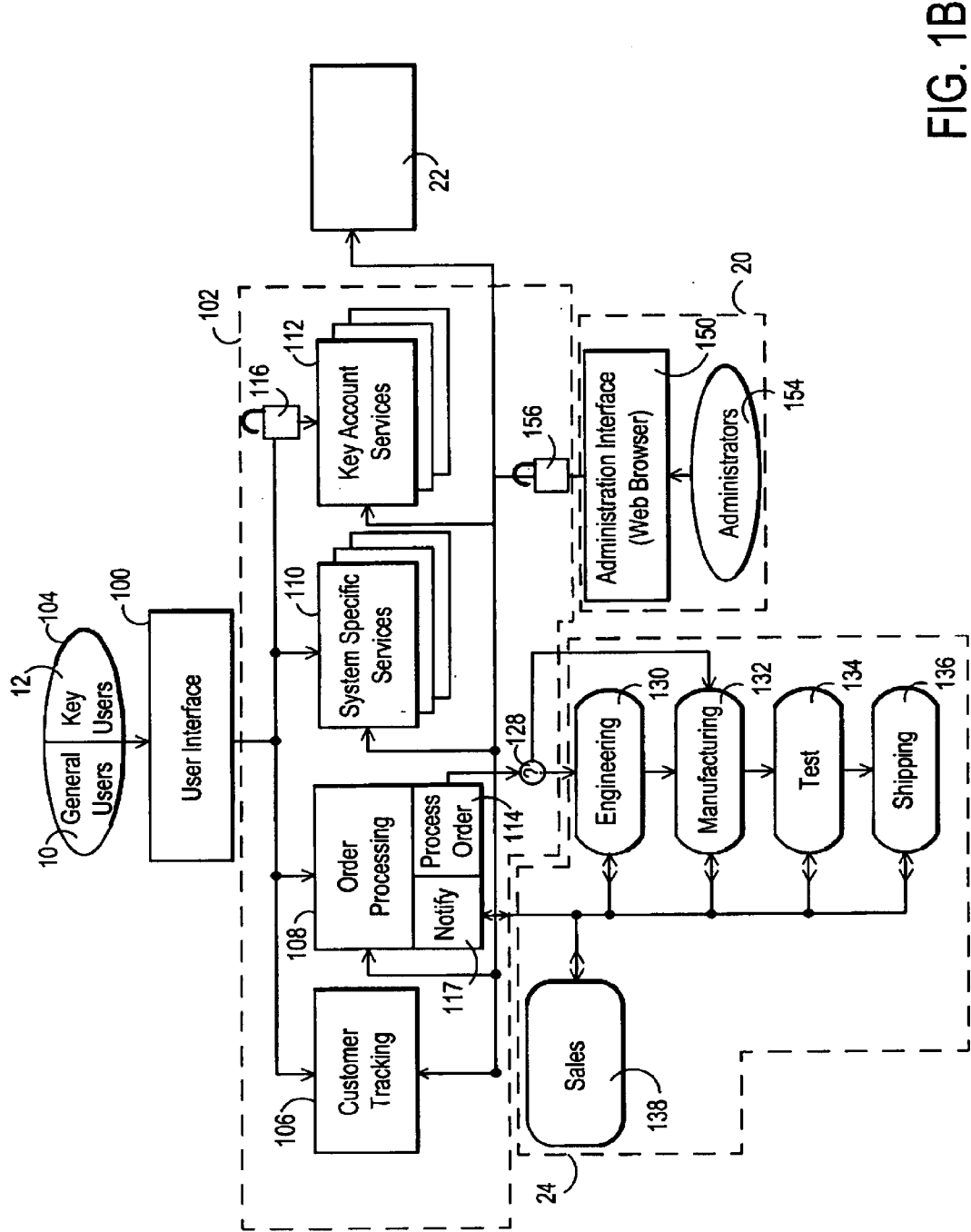
FIG. 1B is a simplified block diagram illustrating one embodiment of the disclosed network-based systems and methods for ordering and building custom integrated systems over the internet.

FIG. 1B shows one possible example of the embodiment of FIG. 1A in further detail. In this example, network 14 of FIG. 1A may be the public Internet. A user interface 100, for example an Internet web browser on a personal computer operating through an Internet service provider ("ISP"), is used to provide access to a server 102 for one or more online users 104, e.g., online customers, who may be general users 10 and/or Key users 12, as described in relation to FIG. 1A. Alternatively, user interface 100 may be provided through any other type of computer network and associated software and hardware components suitable for linking multiple computing systems including, but not limited to, a private intranet network (e.g., linking users and hosts such as employees of a corporation or institution), a wide area network (WAN), a local area network (LAN), a wireless network, or any other network environment of connected computer systems. Although particular embodiments are described herein in which access and user-specific privileges are provided to both general and Key users, the disclosed network-based systems may be structured to only offer access to general users, i.e., with no Key user registration flow path, or vice-versa. Furthermore, it will be understood that multiple Key Accounts and/or multiple classes of Key Accounts may be offered by server 102, and that multiple general user flow paths may optimally be offered, for example, to allow general users to self-select a particular ordering and configuration flow path having a category of privileges most suitable to a particular general user's needs.

As shown in FIG. 1B, server 102 includes four exemplary server functionalities 106, 108, 110 and 112 that may, for example, be displayed by server 102 as individual web pages that may be accessed via links displayed on a home web page. These functionalities allow among other things, an online user 104 to select a classification of a type of systems integration and/or engineering service they require, and to perform certain utility functions such as Order Processing. Although four exemplary functionalities are shown in FIG. 1B and described further herein, it will be understood that benefits of the disclosed network-based methods and systems may be realized using fewer or additional server functionalities as well.

In the embodiment illustrated in FIG. 1B, two classifications of configuration and ordering functionalities are provided: System Specific Systems and Services 110 available to all online users 10 and offering a standard set of system configuration and engineering services options, and Key Account Systems and Services 112 available to particular users, or groups of users, 12 and offering a superset or customized set of system configuration and engineering services options. As shown in FIG. 1B, multiple functionalities 110 and/or 112 may be provided on server 102, each having differing sets of system configuration and/or engineering options tailored to specific customers or groups of customers. Thus, for example, two or more different Key Account Systems and Services 112 functionalities may be provided on server 102 for two or more respective corporate customers, with options of each functionality tailored to the needs of its respective customer.

As shown in FIG. 1B, Key Account Systems and Services 112 may be protected by a password function 116 to prevent others (e.g., competitors of the user) from learning specifics about the systems and services used or preferred by that user. Although not necessary to realize the benefit of the disclosed method and systems, the provision of separate and discrete classifications of integrated system configuration functionalities may be used to tailor options for a particular user 104 or online ordering session so as to facilitate automatic configuration and generation of automatic and immediate price quotes for the selected integrated systems and/or services.

Examples of system configuration options that may be provided through System Specific Systems and Services 110 and/or Key Account Systems and Services 112 include, but are not limited to, one or more individual hardware/software component types for inclusion in an integrated system either with each other or with a fixed or predefined sub-configuration of other hardware components, pre-set combinations or sub-combinations of two or more hardware/software component types for inclusion in the integrated system optionally with other individual hardware/software components, operating features or characteristics of the integrated system, and/or hardware/software features and/or components that require custom engineering.

When either of the configuration and ordering functionalities 110 or 112 is selected by an online user, a price quote for an integrated system and/or engineering service is generated automatically using information input by the user 104 by a formula specific to the classification of system or service selected by the online user. Using the appropriate formula, the price of system and/or service is calculated using variables such as materials cost, engineering services cost, cost of assembly and company business models. A delivery date may also be optionally included in the quote and may be calculated based on a formula that considers, for example, variables such as current manufacturing load and complexity of engineering service. It will be understood with benefit of this disclosure that the preceding price and delivery date variables are exemplary only and that fewer variables, or other variables not listed may be used in addition to, or as an alternative to, those variables listed.

Figure 3:
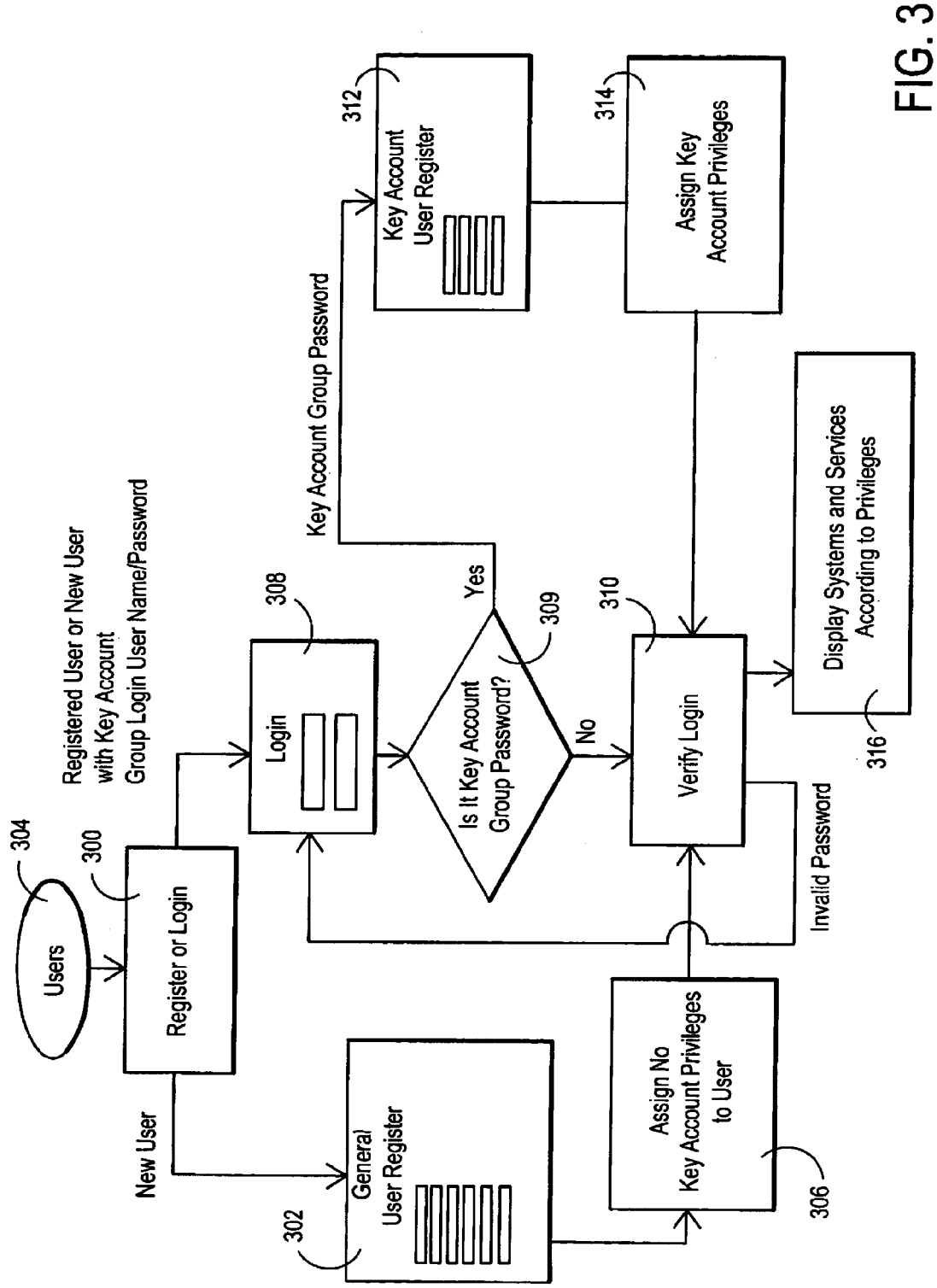
FIG. 3 is a simplified block diagram of online registration flow over the internet according to one embodiment of the disclosed network-based systems and methods.

Still referring to the exemplary embodiment illustrated in FIG. 1B, System Specific Systems and Services 110 may be made available to all online users 104 and may be selected by an online user 104 by clicking on an appropriate link, for example, displayed in a menu on a website home page on server 102 and by completing a login or registration process as described, for example, in relation to FIG. 3. In a similar fashion, Key Account Systems and Services 112 may be made available to particular online users 104 through an appropriate link and, for example, via a password function 116 that is described further in relation to FIG. 3. Upon selection of either System Specific Systems and Services 110, or Key Account Systems and Services 112 (coupled with successful completion of password function 116), a graphical interface may then be displayed for receiving information defining a requested integrated system or service from online user 104. In one embodiment, a graphical interface may first display two or more integrated system types from which an online user 104 may select the desired system type. Upon selection of the desired system type, a more detailed graphical interface may be displayed to provide the online user 104 the ability to specify individual component types and/or features for inclusion within the selected integrated system type by, for example, selecting from a list of pre-determined options that may be displayed as one or more separate lists of predetermined components and/or features.

For System Specific Systems and Services 110, the graphical interface may comprise a menu (e.g., a pull down menu displaying several system types) available to all online users and offering a standard set of integrated TMA system configuration options (e.g., system components and/or features) that may be selected and/or defined by the online user 104 according to the implicated category of online custom system 200 (e.g., 202, 204, 206). These system configuration options may include, for example, desired TMA system type (e.g., a test rack system, telecommunications test system, semiconductor test system, power supply test system, automotive test system, etc.), desired individual hardware components for the TMA system (e.g., EMO power controller and power distribution type or brand, rack mounted computer type or brand, monitor type or brand, power supply type or brand, number of power supplies, etc.), desired sub-systems of integrated hardware components for the TMA system (e.g. two or more separately integrated hardware pieces), desired features of the TMA system (e.g., system characteristics or operating parameters such as size, weight, input/output capacity, signal types going into the system, power requirement, controller capacity and speed, etc.). Examples of selectable integrated system feature lists that may be displayed for a test rack include, but are not limited to, a first selectable list of rack cabinet characteristics such as height, width, depth, accessories; computer characteristics such as processor speed, number of I.O. slots; monitor type such as CRT or flat panel; EMO System characteristics, Power Distribution units, power supplies, etc. If desired, a user may be optionally given the option of entering requests for specific engineering services in textual format. For example, blanks may be provided within the graphical interface to allow the online user 104 to input text related to requested custom engineered system or components.

Upon selection of Key Account Systems and Services 112 (coupled with successful completion of password function 116), a graphical interface may then be displayed comprising a specialized or tailored menu of integrated TMA system configuration options available to a specific online user 104, or specific group of such online users, as that user or group of users is identified during completion of password function 116. The tailored contents of such a tailored or specified list may be pre-defined by a specific user (e.g., a corporation for use of its employees or consultants) to include a list of specific component types, component brands, component configurations, component prices, system total price, delivery time, etc. In this regard, a list may be so-defined in any manner to reflect, for example, a users' desire to price and order standardized integrated test systems and/or to limit price and/or delivery time. Once Key Account Systems and Services 112 is initiated by a particular online user 104, a set of graphical interfaces may be displayed and completed by user 104 in a manner similar to that described for System Specific Systems and Services 110.

A tailored list of pre-defined component and/or feature options for display through Key Account Systems and Services 112 may be defined for an individual user or group of users to include, for example, one or more component options not available to general users through System Specific Systems and Services 110, including proprietary and/or specialized component options and/or configurations. Such a tailored list may also or alternatively include a narrowed list of component options as compared to those options available to general users. Furthermore, an organization such as a corporation may pre-define different customized or tailored component menus that are password dependent, so that access to different component options, price limits, etc. may be provided to different employees, consultants or groups of same by entering different passwords. Pre-defined or tailored component lists for use in Key Account Systems and Services 112 may be entered into server 102 in any suitable fashion including automated request or entry of component list information directly into server 102 through a password function, and/or through manual communication of the component list information (e.g., via email, verbal communication, etc.), for example, to Administrators 154 for entry through Administration Interface 150.

Either or both of Systems Specific Systems and Services functionality 110 and/or Key Account Systems and Services functionality 112 may optionally be provided with a graphical interface that displays selectable representations (e.g., photograph, drawing, computer-generated representation, etc.) of components for inclusion in an integrated system rather than, or in addition to, a selectable list of components as has been previously described. Such selectable component representations may be two or three-dimensional representations and may be displayed, for example, in a selectable component area of the graphical interface. Individual components (or alternatively, a dynamically user-created customized list of components) may be selected by a user for inclusion into an integrated system by clicking and dragging each desired component (or list of components) into a configured system display area (e.g., an empty test rack, or one of several selectable empty test racks) of the graphical interface. As each component is dragged into the configured system area, it may be added to the integrated system order in the same manner as described for component options selected from a pull down menu, or other selectable component list. It may also be graphically displayed installed with other selected components of the integrated system (e.g., as a photograph, drawing or computer-generated representation).

A configured system display area of a graphical interface capable of displaying selectable representations may be optionally programmed to display a configured integrated system in two or three dimensions as it would appear in final assembled form, as delivered to the user/customer. In the case of three-dimensional display, the online user may be given the ability to rotate the configured integrated system display to view one or more sides of the configured and assembled system. For example, an online user may choose to display the back-side of a configured test rack so that relative position of connectors may be viewed. This may be accomplished once all desired components of the system are selected by the user, or may optionally occur in real time as each component is added to the system by the user. In this manner, a user may view an assembled configured system prior to placing an order, and may interchange or select differing components and view how the appearance or interrelation of the assembled integrated system changes correspondingly.

Server 102 of FIG. 1B is shown having two additional utility functionalities: Customer Tracking functionality 106 for determining the privileges assigned to a given user and/or for collecting information about the user (e.g., telephone number, shipping address, billing information) or the user's needs (e.g., future instrumentation needs or desires); and Order Processing functionality 108 for allowing a user 104 to track the status of a placed order from the initial engineering stage through final stage of shipment to the user. In the illustrated embodiment, Customer Tracking functionality 106 is used to determine the server or website privileges given to each particular online user. Such privileges include, for example, types of system features and components that may be selected, types of integrated systems that may be configured, types of engineering services that may be requested, limits on quoted price and/or delivery time, etc. For example, any given online user 104 that visits server 102 may by default be given access to all the privileges available through System Specific Systems and Services 110. However, an online user 104 may also be given the opportunity to register with the server 102 in order to receive additional privileges offered beyond the general privileges offered to all users to the site. These additional privileges may then be accessed through the Key Account Systems and Services functionality 112. Furthermore, a given online user 104 may also be assigned privileges for a particular group of users (e.g., employees of a company) and given access to these privileges through the Key Account Systems and Services functionality 112 as well.

An Order Processing functionality 108 may be provided to coordinate processing of an order and/or to give online users 104 the ability to keep a record of submitted orders and optionally to track the status of a placed order for systems integration or engineering services through the various departments of Engineering 130, Manufacturing 132, Testing 134, and Shipping 136 of the system or service. For example, a given department may be automatically notified when the preceding department has completed its work on the system, or is near to completing its work on the system. Sales department 138 may be notified when the system is shipped. The term "department" is used herein to refer to any functional organization of personnel, automated equipment or combination thereof capable of performing the indicated service.

In the illustrated embodiment, Engineering 130 may comprise a department of engineering personnel responsible for performing any engineering act/s required to fulfill the specific requirements of an online user order, e.g., custom design of component/s, writing of software, documentation preparation, printed circuit design, cabling design, mechanical design, etc. In Manufacturing 132, pre-existing and/or now-existing custom-engineered hardware, software, and documentation components may be assembled by manufacturing personnel and/or automated equipment to create an integrated TMA system that fulfills the requirements of an online user 104 as specified in System Specific Systems and Services functionality 110 or Key Account Systems and Services functionality 112.

To facilitate pricing, manufacture and documentation of integrated systems, component database 22 accessible by server 102 may be maintained that includes component specific information for individual components and sorted by component name. Such component specific information may include, but is not limited to, description, price, computerized drawing (information (e.g., CAD drawings), documentation information, bill of materials information, shipping weight, delivery factors, assembly instructions, I/O interconnect wiring diagram, etc. Component database 22 may be accessed by server 102 and/or individual departments 130, 132, 134, 136, 138 as necessary to retrieve appropriate information necessary or desirable to facilitate online configuration, pricing, assembly, manufacture, documentation, etc. of integrated systems.

In one embodiment using a component database 22, a bill of materials and/or manufacturing/assembly drawings and/or instructions may optionally be automatically generated by server 102 (with optional input from Engineering 130 if necessary) and provided to Manufacturing 132 for use in assembly of the integrated system. Where manual assembly occurs, the bill of materials, drawings and/or instructions may be communicated for electronic display and/or may be printed out for use by assembly personnel. Electrical interconnect drawings may also be automatically generated and provided to Manufacturing 132 Where assembly is automated, bill of materials, drawings and/or instructions may be provided in computer code or other system-readable communication suitable for facilitating automatic assembly of the integrated system. Drawings, bill of materials and/or assembly instructions may also be made available to a user 104 in hard copy or electronic form, if so desired.

In another possible embodiment using a component database 22, computerized drawings of configured systems, subsystems or individual hardware components may optionally be maintained in database 22. Such drawings may include additional information, such as dimensions of components, etc. Upon request by an online user, computerized drawings may be automatically or dynamically viewed or downloaded. When a completed drawing exists for the specified integrated system, it may be viewed or downloaded as is. In the case of custom-configured systems, individual component drawings may be automatically combined or integrated to create a drawing of the final assembled integrated system.

Manufacturing 132 may also be responsible, alone or in conjunction with Engineering 130, for supplying and/or creating integrated documentation to accompany an assembled integrated TMA system. In this regard, it will be understood that integrated system documentation (e.g., integrated system operating instructions, component descriptions and specifications, etc.) may be automatically generated or custom written, depending on the nature of the configured system. In those cases where integrated system documentation is automatically generated, it may be selectively assembled so as to only include information relevant to the components present in the ordered system, reducing the size and increasing conciseness of the documentation.

Following assembly, an integrated TMA system is sent to Test 134 where proper operation and interaction of the hardware and software components of the system is verified. In this regard, an automated test program may be used to verify the operation of the system (e.g., verify proper driver operation by activating all of the systems I/O's, checking all combinations of parameters of a software program, etc.). In one embodiment, the automated test program may be a regression test builder that builds regression tests by pulling source material from a header file for the driver, and from this information generates a text file that contains a list of all the driver's functions and variables. The automated test program may then read this text file to verify the operation of the driver. Alternatively, the information required by the automated test program, or a dynamically created automated test program itself, may automatically be generated based on the nature and the requirements of the system obtained during online user configuration of the integrated system components and/or features. In one exemplary embodiment, an automated test program may be used to execute tests on the assembled integrated TMA system by reading a file that contains a list of all the required tests and pass/fail criteria for the user configured system. The file may be automatically generated from the requirements entered during online configuration.

In Test 134, corrections are made to systems that are not operating according to the original requirements. Once proper operation of an integrated TMA system is verified, the system is moved to Shipping 136 where the final system is packaged as necessary and shipped to the user/customer. Additional departments may exist to provide other desired functions. For example, FIG. 1B shows Sales department 138 that may exist to monitor or coordinate placement and fulfillment of orders for quality control, sales management, customer relations and other sales-related purposes. It will be understood that the departments illustrated in FIG. 1B and described herein are exemplary only and that any alternative number and/or type of departments suitable for accomplishing the desired order processing and notification functions may be employed.

Order Processing functionality 108 may be configured as a part of server 102, and may communicate with various departments 130, 132, 134, 136 and 138 using a separate system vendor network that may be, for example, a private intranet network, WAN, LAN or any other type of computer network suitable for linking communication/computer components that are provided for each of these departments. As shown in FIG. 1B, Order Processing functionality 108 may include an Order Processing sub-functionality 114 that directs or coordinates the fulfillment of a placed order through the separate departments as shown in FIG. 1B. In one embodiment, order processing sub-functionality 114 may also make a preliminary determination whether or not engineering services (e.g., categories 204 and 206) will be implemented to configure, quote and/or fulfill a particular online user order.

Notification sub-functionality 117 may be provided to collect order information from each of departments 130, 132, 134, 136, and 138, and to provide this information, proactively (e.g., by sending automatic or directed email) or reactively (e.g., by responding to a request made through server 102) to online users 104 and/or one or more of departments 130, 132, 134, 136 and 138. For example, using Notification functionality 117, users 104 or other departments of the company, such as Sales 138, may check the status of the ordered integrated TMA system or service and may be automatically notified as the order progresses from one stage to the next during development, for example, via email. The ability to retrieve other order information such as anticipated production and ship dates in real time from Order Processing functionality 108 may also be provided if desired. As shown in FIG. 1B, information may be transferred proactively and/or reactively between two or more of departments 130, 132, 134, 136 and 138.

To enhance efficient fulfillment of a given placed order, the progression of the order may be made dependent on the type and/or particular characteristics of the order. For example, in the embodiment illustrated in FIG. 1B, server 102 is provided with a decision point 128 where the proper routing of each placed order is evaluated by Order Processing sub-functionality 114. If the evaluated order may be filled by assembling an integrated system from pre-existing hardware, software, and documentation components, the order is sent directly to Manufacturing 132, and then onto Testing 134 and Shipping 136. However, if the evaluated order requires hardware and/or software engineering (e.g., non-existing or custom components must be designed and fabricated) and/or requires custom documentation, the order is first sent to Engineering 130. Once any necessary non-existing hardware, software, and/or documentation components are designed in Engineering 130, the order then moves to Manufacturing 132.

The evaluation made at decision point 128 may be accomplished by virtue of, for example, the type of integration requested by an online user 104. In this regard some integration tasks may be implemented by manufacturing, while other integration tasks may require engineering. Other integration tasks may require a combination of manufacturing and engineering. Thus, in one exemplary embodiment a binary switch or decision point may be provided and the decision made by same based on the category of online integration system and services (e.g., categories 202, 204, or 206 of FIG. 2 and/or sub-categories 208, 210, 212, 214, 216, or 218) selected or implemented by an online user 104. In this regard, either the complete integration service or each section of the integration service may be classified as requiring engineering or not.

Also shown in FIG. 1B is Administration Interface 150 that provides access to server 102 for one or more online administrators 154 for server maintenance purposes and to input managed information to server 102. Administration Interface 150 may also be used by administrators 154 to monitor traffic through server 102, monitor quality of the ordering system, communicate with departments, etc. Like Customer Interface 100, Administration Interface 150 may be through an Internet web browser or alternatively a connection made through a private intranet network, WAN, LAN, etc. Security for administrative access may be provided by an administrative password function 156. Using Administrative Interface 150, Administrators 154 may also set up or modify the costing models for the System Specific Systems and Services 110 and the Key Account Systems and Services 112 using a graphical interface, and advantageously no programming of software code is necessary to change the formula, materials costs, services cost, or company business model of the systems or services. Administrators 154 also have the ability to give or remove privileges to individual online users 104.

Figure 2:
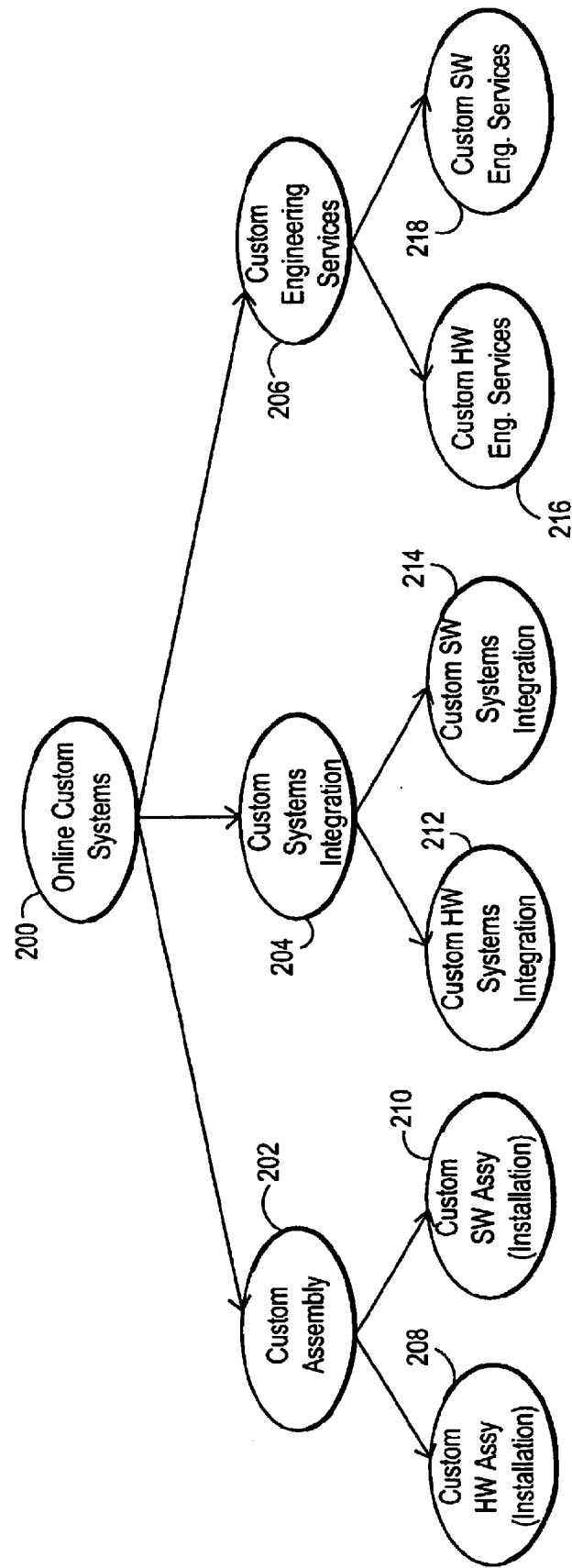
FIG. 2 is a simplified representation of categories of online systems and services possible according to one embodiment of the disclosed network-based systems and methods for ordering and building custom integrated systems over the internet.

FIG. 2 is a simplified representation of categories of online systems and services 200 possible according to several embodiments of the disclosed network-based systems and methods employing configuration and ordering functionalities 110 and 112 of FIG. 1B. In this regard, it will be understood that the categories of systems and services illustrated and described in relation to FIG. 2 are exemplary only, as are example functionalities 110 and 112 of FIG. 1B, and that elements represented in FIG. 1B may be employed separately or independently from those presented in FIG. 2, and vice-versa.

FIG. 2 shows three possible categories of online systems and services 200 that include custom assembly 202, custom systems integration 204, and custom engineering services 206.

Within each category are hardware and software sub-categories that may function separately or cooperatively in the assembly of an integrated system. As discussed in relation to FIG. 1B, each sub-category may be offered to online users 104 via a System Specific Systems and Services functionality 110 and/or a Key Account Systems and Services functionality 112, these functionalities being described elsewhere herein.

Custom assembly category 202 represents integration and assembly of user-specified hardware components (category 208) and/or software components (category 210) into an integrated system where no engineering services are required. As previously described, in one embodiment hardware components may include components available from one or more third party hardware vendors and/or software components may include TMA-related software components available from one or third party software vendors. In custom assembly category 202, pre-existing or "off the shelf" non-user specified hardware and/or software components may be selected to achieve or facilitate integration of user-defined components, and/or to achieve user-defined features. A feature or component is considered "user-definable" or "user-specifiable" when its value or identity may be selected or otherwise input or changed by an online network user in a manner described in further detail herein.

The term "feature" as applied to integrated systems herein includes, but is not limited to, system hardware requirements (e.g., analog sampling rates, analog output rates, digital I/O rates, timing I/O rates, local storage, PC interface type/s, connector types, local or remote emergency off capabilities, etc.), system software requirements (e.g., graphical user interface design and/or interaction with user, software processing speed, software compatibility with other types of software, data exchange format, etc.), system documentation requirements (e.g., standard documentation format required for certification, documentation media type, level of non-standardized documentation detail, etc.), operating system compatibility (e.g., Microsoft Windows NT, Apple iMac, Sun, Linux, etc.).

As used herein, the term "component" includes, but is not limited to, hardware, software and documentation elements internal to, or otherwise associated with, the configuration or operation of an integrated system. Components are elements of a TMA system that by themselves without systems integration are incapable of performing automated test or measurement. Examples of hardware components include any individual piece of hardware equipment or sub-system instrument that may be configured and assembled to form an integrated system including, but not limited to, disk drives and plug-in cards, signal conditioning cards, data acquisition cards, PC controllers, power supplies, analog and digital data loggers, analog and digital timing instruments, multi-function data acquisition systems, rack and stack measurement instruments, power distribution, safety and emergency equipment, etc. Examples of software components include, but are not limited to, device drivers, instrument drivers, applications, application development environments (C, C++, LabWindows CVI, LabView, VEE), etc. Examples of documentation components include, but are not limited to, user manuals, AutoCAD drawings, schematics, layout, etc. In the case of custom assembly category 202, such components may be, for example, pre-existing equipment available from one or multiple component vendors including, in one embodiment, from one or more third party vendors.

In the case of custom assembly category 202 each of the software and/or hardware components of the integrated system are selected and integrated based on specifications made by an online user 104. For example, an online user 104 may select software/hardware components and/or integrated system features from pre-determined lists of hardware/software components and/or system features, respectively. An example of custom assembly 208 of an integrated hardware system would be the assembly of user-specified power controller, power distribution configuration, computer controller, computer monitor and power supply into a test rack. An example of custom assembly 210 of an integrated software system would be driver installation, application software installation, and power supply and monitoring software installation. A combination of integration services of categories 208 and 210 is also possible. Pricing of a custom assembled integrated system may be provided as a quote to an online user 104 using any suitable formula or algorithm that takes into account materials cost, assembly time/cost, business expenses (such as overhead), profit margin, etc. This may be done, for example, by starting with base system price and adding price for selected components. Alternatively, labor rate and base material rates may be added and adjusted for profit margin with, for example, a price mark-up rate separately entered into a database.

Delivery date of a custom assembled integrated system may optionally be calculated and provided to a user 104 using a formula that considers, for example, current manufacturing load, delivery time of materials, etc. An example of such a formula is a formula that selects the maximum entered component availability time from all of the components selected for the particular integrated system, and adds a component assembly time and assembly delay time that may be based on product demand. The component availability time, assembly time and assembly delay time may be factors separately entered into a database. If desired, individual component vendors or manufacturers may be given access to such a database for the purpose of entering and/or updating delivery time directly, so as to increase efficiency of updating the formula.

Custom system integration category 204 represents integration and assembly of some pre-existing hardware components and/or software components into an integrated system based on user-specified features and/or components (which may also include user supplied components), but where some component or system level engineering is also required (i.e., design and/or fabrication of additional new or non pre-existing user specified hardware and/or software components to achieve or facilitate integration of user-specified components or components having user-specified features). In one embodiment, custom hardware systems integration category 212 may be implemented as a combination of custom hardware assembly category 208 and custom hardware engineering category 216 (described below), and custom software systems integration 214 may be implemented as a combination of custom software assembly category 210 and custom software engineering category 218 (described below). Similarly, custom systems integration category 204 may be implemented as a combination of custom hardware systems integration category 212 and custom software systems integration category 214.

In the case of custom system integration category 204 one or more hardware and/or software components and/or system features may be specified by an online user 104, for example, from a predetermined list of components or system features (e.g., system characteristics or operating parameters such as size, weight, input/output capacity, power requirement, controller capacity and speed, number of user interface panels, performance requirements, etc.). One or more custom system components and/or features may also be specified by the online user 104. Based on the user-specified information, any additional non-engineered hardware and/or software components necessary to complete the integrated system is identified or selected, for example, from a pre-selected list of components. Furthermore, non pre-existing hardware and/or software components necessary to assemble an integrated system having the specified custom features may be designed or engineered by engineering department 130 of FIG. 1B described elsewhere herein.

An example of custom systems integration 212 of an integrated hardware system would be developing a test system that included off-the-shelf instruments, user supplied electronics and custom designed circuits and mechanics. An example of custom systems integration 214 of an integrated software system would be the assembly of a software program that used customer supplied graphics, customer supplied drivers, standard drivers, and custom developed application software. Pricing of a custom integrated and assembled integrated system may be provided as a quote to an online user 104 using any suitable formula or algorithm that takes into account materials cost, assembly cost, business expenses (such as overhead), profit margin, estimated development time, etc. For pre-existing components, this may be done, for example, in a manner similar to that previously described for custom assembly category 202. For custom engineered components, an algorithm such as described below in relation to FIG. 8 may be employed. The total of pre-existing and engineered component costs may then be added to determine total system cost.

Completion date or delivery time may optionally be calculated using a formula that considers, for example, current manufacturing load, delivery time of materials, etc. This may be done for pre-existing components in a manner similar to that previously described for custom assembly category 202. For custom engineered components, an algorithm such as described below in relation to FIG. 8 may be employed to estimate engineering time. This amount may then be added to the calculated delivery time for pre-existing components described above to determine total integrated system delivery time, and then provided to a user 104.

Custom engineering services category 206 represents engineering and assembly of hardware components and/or software components into an integrated system 216 or 218 based on user-specified features where substantially all components for the integrated system are custom engineered (i.e., new or non pre-existing user specified hardware and/or software components are designed and/or fabricated to achieve or facilitate integration of a system having user-specified features). Although in one embodiment custom engineering services category 206 involves integration of systems containing substantially only custom engineered components, it will be understood that in other embodiments selection of a relatively minor number of existing or "off the shelf" components may be additionally performed to facilitate integration in a manner similar to that described for custom systems integration category 204.

In the case of custom engineering services category 206 one or more custom system features are specified by an online user 104 (e.g., system characteristics or operating parameters such as number and types of signals going into the system, functionality, bus protocol, software requirements, bus interface, etc.). Hardware and/or software components necessary to assemble an integrated system having the specified custom features are not pre-existing or available "off the shelf" so that custom engineering services are required, for example, as performed by engineering department 130 of FIG. 1B described elsewhere herein. An example of custom hardware engineering services 216 that may be performed in the fabrication of an integrated hardware system having user-specified custom features would be design, assembly, testing and delivery of the hardware components of an integrated system based on user specification of the number of signal types going into the system and the system interface. An example of custom engineering software services 218 that may be performed in the fabrication of an integrated software system having user-specified custom features would be the design of a software instrument driver. It will be understood that a combination of custom engineering services 216 and 218 may be performed or supplied in relation to a given particular integrated system having hardware and software components. Pricing of a custom engineered and assembled integrated system may be provided as a quote to an online user 104 using any suitable formula or algorithm that takes into account engineering service cost, materials cost, assembly cost, business expenses (such as overhead), profit margin, estimated development time, etc. This may be done, for example, using an algorithm such as described below in relation to FIG. 8.

Delivery date may optionally be calculated and provided to a user 104 using a formula that considers, for example, current engineering load, current manufacturing load, delivery time of materials, etc. This may be done, for example, using an algorithm such as described below in relation to FIG. 8.

Although custom engineering services category 206 has been described in relation to integrated systems, it will be understood that custom engineered components (hardware and/or software) may also be configured in custom engineering services category 206. An example of a custom engineered hardware component would be the engineering design of a printed circuit board based on user requirements.

FIG. 3 shows a simplified block diagram of one exemplary embodiment of an online registration and privilege determination process that may be used by online users 304 to access server 102 via a network, such as the internet. In this regard, the block diagram of FIG. 3 corresponds to one exemplary embodiment of Customer Tracking functionality 106 of FIG. 1B. Multiple graphical interfaces, for example linked internet web pages, may be used during the registration process to display registration information to users 304 and to accept user registration information from users 304. However, it will be understood that any other suitable method for displaying and/or exchanging information over a network may also be employed.

As shown in FIG. 3, users 304 may begin the online registration process at login page 300 which may be accessed, for example, through a home page or other menu page displaying a link to page 300. At page 300 a previously registered general or Key Account user may click on a link to go to a login page 308 where existing username/account name and password information may be entered. Alternatively login page 300 may be configured to accept registered user login information directly. A new general user may click on a registration link to be taken to a general registration page 302 where the general user may enter required information to set up a new general account. A new Key Account user may enter a Key Account group username and password at login page 308 corresponding to a pre-existing Key Account (e.g., user-specific Key Account previously set up for a particular corporate customer, etc.) From login page 308 users are taken to Key Account decision block 309 where new Key Account users who have entered a Key Account group password (e.g., corresponding to a company, corporation, etc.) are directed to Key Account registration page 312. Existing general users or existing Key Account users (already having personalized Key Account username and password) are taken to login verification page 310.

At general registration page 302 a new general user may enter registration information such as name, title, company name, phone number and email address, desired personalized username and password, shipping address, billing address, etc. Similar information may be entered by a new Key Account user at Key Account registration page 312, including a personalized user name and password. In one embodiment it is possible that certain other information, such as billing and shipping information, may be pre-defined during Key Account setup according to the wishes of a corporate or group Key Account customer.

Still referring to FIG. 3, when progressing from general registration page 302 a new general user starts with no assigned Key Account privileges over the default privileges available to general users through the System Specific Systems and Services functionality as shown in FIG. 3 at login step 306, and is taken next to login verification step 310. At login step 314 a Key Account user is assigned particular Key Account privileges corresponding to the privileges of the Key Account Systems and Services for the group whose private user name and password were originally entered at login page 308 during the first time through the registration, and then transferred to login verification page 310. Once a Key Account user has so registered and been assigned Key Account privileges, the user may in the future login with the selected personalized user name and password at login page 308 and be taken directly to login verification page 310.

At login verification 310, username and password information is verified and a user is classified as either a general user or Key Account user based on this information. Registered Key Account and general users are taken from login verification page 310 to systems and services display page 316. At step 316, systems and services options are displayed according to the particular privileges assigned to a user, and is thus a dynamically built page according to the identity of the user. For example, when used in conjunction with the embodiment of FIG. 1B, general users are displayed System Specific Services 110 that are available to all online users and that include a standard set of system configuration options. On the other hand, Key Account Systems and Services 112, offering a superset or customized set of system configuration and/or engineering services options, may be displayed to Key Account users according to the key account privileges pre-assigned to the particular Key Account user at step 314 in a manner as described elsewhere herein in relation to FIGS. 1, 2 and 4.

Figure 4:
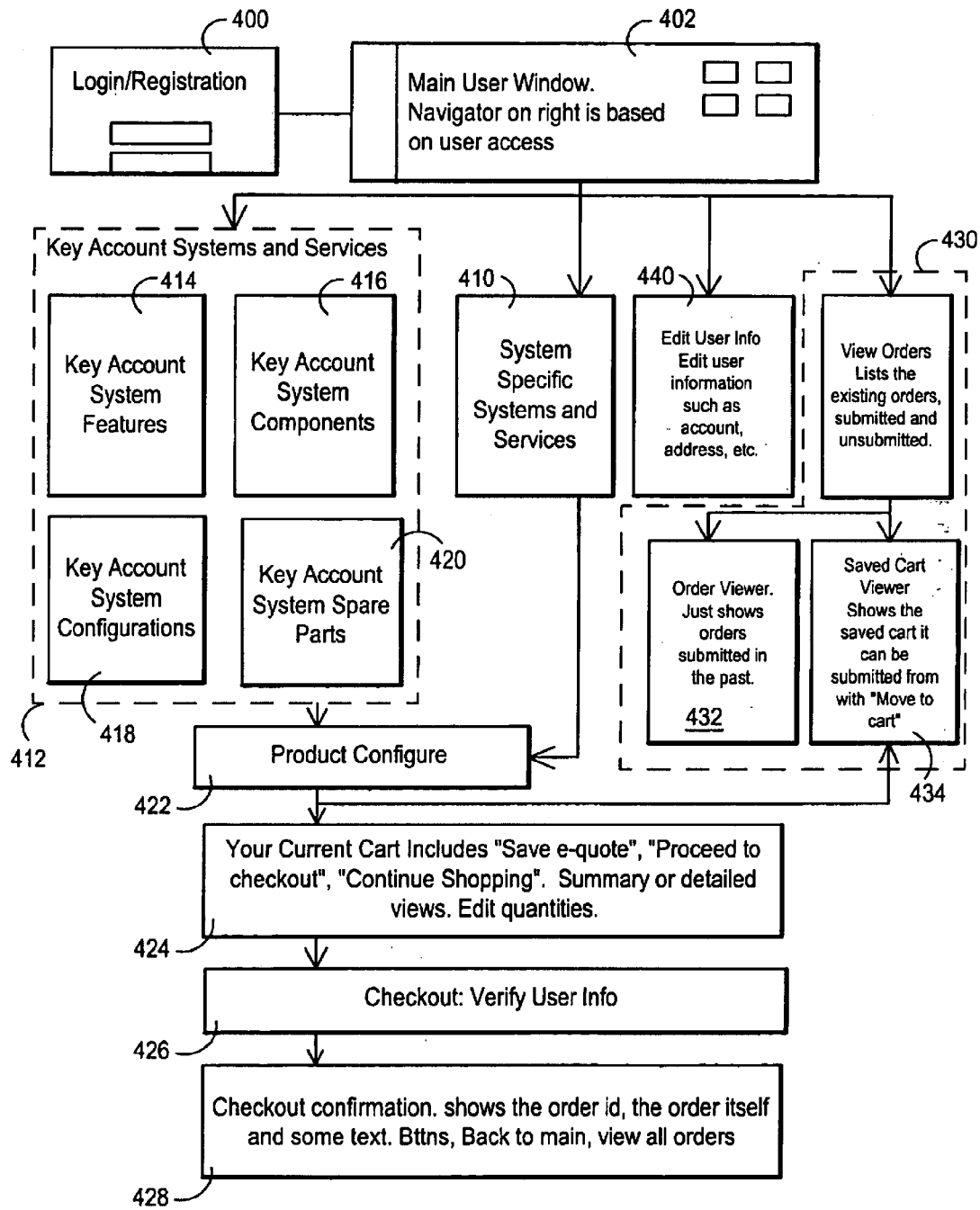
FIG. 4 is a simplified block diagram of online flow for configuring and ordering integrated systems over the internet according to one embodiment of the disclosed network-based systems and methods.

FIG. 4 shows a simplified block diagram of one exemplary embodiment of an online process for configuring and ordering integrated systems over a network, such as the internet. As with FIG. 3, multiple graphical interfaces such as linked internet web pages, or any other suitable method for displaying and/or exchanging information over a network may be employed to implement the method of FIG. 4. In one embodiment, most or all of the graphical interfaces may be dynamically created each time based on information supplied or input by a particular user.

As shown in FIG. 4, general and Key Account users may proceed to main user menu 402 from a login/registration utility 400, such as that described in relation to FIG. 3. Main user menu 402 may include a navigation section with links corresponding to the privileges assigned to a particular online user during the online registration process. In this regard, all general users may be given access to, for example, a clickable link providing access to the options of Systems Specific Systems and Services 410, which may correspond to functionality 110 of FIG. 1B. Beside those options described elsewhere herein, Systems Specific Systems and Services 410 may also offer a variety of other hardware and software options, such as a selectable list of spare component parts or standard drivers if so desired. Key Account users may also (or alternatively) be provided with a clickable link to Key Account Systems and Services 412, which may correspond to functionality 112 of FIG. 1B. As described in relation to FIGS. 1 and 2, Key Account Systems and Services 412 may include a menu with links to, for example, a customized selectable list of system features 414, customized selectable list of system components 416, customized selectable list of system configurations or sub-configurations 418, customized selectable list of spare component parts 420, etc. Provision for input of engineering service requests may also be made in a manner as described elsewhere herein. It will be understood that these customized lists may be set up so that they are capable of each separately functioning to fully define an integrated system, and/or so that a combination of one or more customized lists (e.g., system features plus system components) may function together to fully define an integrated system.

Still referring to FIG. 4, once an online user has configured an integrated system using either Key Account Systems and Services 412 or System Specific Systems and Services 410, a configured system quote page 422 (including estimated system price and/or estimated system delivery time) may be generated by an online user by, for example, clicking on an appropriate link displayed in a graphical interface. Configured system quote page 422 may be implemented by a module capable of displaying a dynamically created page having content based on information entered by a user in Key Account Systems and Services 412 or System Specific Systems and Services 410.

Within configured system quote page 422, provision may be made so that an online user may change one or more configuration options and click a link or button to recalculate price and/or delivery time quote 422. Clickable links or buttons may also be provided to allow the online user to, for example, accept the quote and add it to a cumulative list of items to order (e.g., "Add to Cart"), allow the user to view the terms and conditions of the sale, etc. A cumulative list or "Cart" page 424 displays ordered item/s and may be set up to allow the user to display each quoted item as a single line item (e.g., "Summary View") or detailed line by line component/feature list (e.g., "Detailed View"), to allow the user to save the quote/s for later retrieval, to allow the user to continue shopping for additional items, to allow the user to submit an order for the configured item/s (e.g., "Proceed to Checkout"), view sale terms and conditions, update price, etc. Once a user chooses to submit the order or check-out, user information is verified in step 426, i.e., name, phone number, billing address, shipping address, etc. A confirmation page 428 may then be displayed for a successfully completed order and may display, for example, a server-assigned order identification or tracking number, a detailed line by line summary of the components/features/services of each item ordered, a price and/or delivery time quote for each component/feature/service, etc.

If desired, online users may be given the option of affecting delivery time by substitution or removal of particular components of an integrated system in step 422. For example, if the estimated delivery time is too long due to unavailability of one component of a configured system, then the online user may be so informed and allowed to remove this component from the assembled and shipped integrated system, so as to reduce the delivery time. When the removed component becomes available, it may then be shipped to the user separately as a spare part, for installation by the user. Such installation may be facilitated by documentation and drawings that optionally may be provided, as described elsewhere herein. Alternatively, a user may be given the ability to enter a desired delivery date for a specified integrated system, and may in return be given a list of components specified for that system that will be available by the desired delivery date.

FIG. 4 also shows order viewer 430, in one embodiment corresponding to Order Processing functionality 108 of FIG. 1B. As shown, this feature may be accessed, for example, from main user menu 402 or from a later point in the ordering process, such as from configured system quote page 422 or cumulative list page 424, via a clickable link or button. Using order viewer 430, a user may view order status information such as status of previously submitted orders 432 (e.g., current state of engineering and/or assembly, updated shipping date, etc.), status of unsubmitted but saved orders 434 (e.g. "Saved Cart"). FIG. 4 also shows user information editor 440, through which an online user may make changes to account information, such as shipping or billing address, etc.

FIG. 5 illustrates simplified website flow for registration, configuration and purchase of a custom integrated test rack system by a general Internet user using, for example, one exemplary embodiment of Systems Specific Systems and Services functionality 110 of FIG. 1B. In general login/registration step 500, a general user gains access to the website server by logging-in or registering with a general username and password in a manner as described elsewhere herein. Following general login/registration, a general user is provided with the opportunity to select from general configurable options for a test rack system corresponding to the privileges assigned to all users of the website, for example, by means of website graphical interface as described elsewhere herein. Configurable options may be specified or selected by a general user as individual components (e.g., including components from one or more third party vendors) or features of an integrated test rack in step 502. Examples of individual components that may be selected from predefined lists of components include, but are not limited to, standard test rack size (e.g., height, depth, width—such as a 19 inch test rack, etc.), quality, brand, emergency off ("EMO") power controller (including switched/unswitched power controller, local EMO, remote EMO, cableless EMO with fail safe, and/or side panel removal EMO), power distribution, rack mounted computer type and/or PC controller configuration, monitor type or brand, monitor mount type, power supply type or brand, optional additional power supply type or brand, rack panels, locking castors, forced air cooling, wiring ducts, fixed or pull-out shelves, measurement instruments shelves, castors, cooling fans, etc. Examples of integrated test rack system features that may be selected from predefined lists include, but are not limited to, variable system parameters such as system size, system weight, system input/output capacity, system power requirement, system controller capacity and speed, signal types, signal count frequency, voltage range, analog/digital, etc.

In addition to, or as an alternative to configurable system options of step 502, configurable options may also be optionally specified or selected by a general user as pre-configured test rack systems or sub-systems having pre-determined components, such as two or more integrated hardware components, in step 510. In such a case, two or more test system components such as test rack size, power controller and power distribution type or brand, computer type or brand, monitor type or brand, power supply type or brand, etc. may be pre-specified, and optionally have a pre-calculated price quote displayed. It will be understood that the configurable options of steps 502 and 510 may be performed individually, together in a single graphical interface, or sequentially. Furthermore, it is possible that a pre-configured sub-system having two or more pre-specified components may be selected in step 502 in combination with selection of one or more individual components in step 510 to configure a single test rack system.

Further optionally, a general user may be additionally or alternatively allowed to select from a pre-defined list of spare part or accessory components related to test rack systems in step 512. In this regard, spare part or accessory components may be selected that are for use with, or that relate to, a test system configuration specified in steps 502 and/or 510, or may be separate stand-alone individual components. Examples of spare part or accessory components that may be selected in step 512 include, but are not limited to, individual components such as ISA and PCI boards, cables/accessories, bus interfaces, motion control, power supplies, rack accessories (e.g., fixed and pull out shelving, rail mounted shelving, screws, nuts, washers), signal conditioning, chassis and modules, solid state relays, software, measurement instruments, etc. From step 512, a general user may proceed directly to steps 506 and 508 for a price quote and purchase. Alternatively, a general user can proceed or follow step 512 with configuration steps 502 and/or 510.

Upon selection of components and/or pre-configured system or sub-system in steps 502 and/or 510, a user may proceed directly to step 506 to obtain a price quote on the user-defined test rack system and, if desired, proceed to check-out step 508 to purchase the test rack system. In this regard, generation of price quote and purchase of the test rack system may be accomplished by interaction between a user and a network server as described elsewhere herein. Alternatively, a user may further define or select additional test rack components and/or features in step 504 prior to obtaining a price quote and proceeding to check-out. Examples of such additional test rack component options include, but are not limited to, measurement instruments, plug-in boards, signal conditioning and associated connector or terminal blocks, etc. Furthermore, a user may optionally be given the opportunity to select and/or enter text specifying or describing user-supplied components or non-standard components for which provision is desired in the configured integrated test rack system.

FIG. 6 illustrates simplified website flow for registration, configuration and purchase of a custom integrated test rack system by a Key user using, for example, one exemplary embodiment of Key Account Systems and Services functionality 112 of FIG. 1B. In login/registration step 601, a Key user gains access to the website server by logging-in or registering with personalized username and password in a manner similar to a general user. As previously described in relation to FIG. 3, additional or alternate website privileges are assigned to the Key user based on the identity of the personalized user and the username/password given. In this regard, a Key user is provided with the opportunity to select configurable options for a test rack system corresponding to the assigned Key Account privileges, for example, by means of website graphical interface as described elsewhere herein. Relationship between configurable options and Key Account privileges is described elsewhere herein.

Configurable options may be specified or selected by a Key user as individual components (e.g., including components from one or more third party vendors) or features of an integrated test rack in step 602. Examples of individual components that may be selected from predefined lists of components include, but are not limited to, standard test rack size (e.g., height, width—19 inch rack), quality, brand, emergency off ("EMO") power controller (including switched/unswitched power controller, local EMO, remote EMO, cableless EMO with fail safe, and/or side panel removal EMO), power distribution, rack mounted computer type and/or PC controller configuration, monitor type or brand, monitor mount type, power supply type or brand, optional additional power supply type or brand, rack panels, locking castors, forced air cooling, wiring ducts, fixed or pull-out shelves, etc. Examples of integrated test rack system features that may be selected from predefined lists include, but are not limited to, variable system parameters such as system size, system weight, system input/output capacity, system power requirement, system controller capacity and speed, signal type, signal count, etc.

In addition to, or as an alternative to configurable system options of step 602, configurable options may also be specified or selected by a Key user as pre-configured test rack systems or sub-systems having pre-determined components, such as two or more integrated to hardware components, in step 610. In such a case, two or more test system components such as test rack size, power controller and power distribution type or brand, computer type or brand, monitor type or brand, power supply type or brand, etc. may be pre-specified, and optionally have a pre-calculated price quote displayed. It will be understood that the configurable options of steps 602 and 610 may be performed individually, together in a single graphical interface, or. sequentially. Furthermore, it is possible that a pre-configured sub-system having two or more pre-specified components may be selected in step 602 in combination with selection of one or more individual components in step 610 to configure a single test rack system.

Further optionally, a Key user may be additionally or alternatively allowed to select from a pre-defined list of spare part or accessory components related to test rack systems in step 612. In this regard, spare part or accessory components may be selected that are for use with, or that relate to, a test system configuration specified in steps 612 and/or 610, or may be separate stand-alone individual components. Examples of spare part or accessory components that may be selected in step 612 include, but are not limited to, individual components such as ISA and PCI boards, cables/accessories, bus interfaces, motion control, power supplies, rack accessories (e.g., fixed and pull out shelving, rail mounted shelving, screws, nuts, washers), signal conditioning, chassis and modules, solid state relays, software, measurement instruments, etc. From step 612, a Key user may proceed directly to steps 606 and 608 for a price quote and purchase. Alternatively, a Key user may proceed or follow step 602 with configuration steps 612 and/or 610.

Upon selection of components and/or pre-configured system or sub-system in steps 602 and/or 610, a Key user may proceed directly to step 606 to obtain a price quote on the user-defined test rack system and, if desired, proceed to check-out step 608 to purchase the test rack system. In this regard, generation of price quote and purchase of the test rack system may be accomplished by interaction between a Key user and a network server as described elsewhere herein. Alternatively, a Key user may further define or select additional test rack components and/or features in step 604 prior to obtaining a price quote and proceeding to check-out. Examples of such additional test rack component options include, but are not limited to, measurement instruments, plug-in boards, signal conditioning and associated connector or terminal blocks, etc. Furthermore, a user may optionally be given the opportunity to select and/or enter text specifying or describing user-supplied components or non-standard components for which provision is desired in the configured integrated test rack system.

As would be known in the art, test racks may come in a variety a forms and typically include frames within which components may be mounted. Standard TMA test racks are often sized in standard widths to accommodate TMA industry standard component sizes. TMA industry standard test racks include, for example, 19 inch test racks and 23 inch test racks, which will allow the mounting of 19 inch and 23 inch components, respectively. One such 19 inch test rack is a 19" Cabinet available from Schroff, Inc, which includes interior mounting rails, an integral front flange for 19 inch mounting in a fixed recessed position a few inches (about 60 mm) from the front and rear of the rack, steel side covers providing easy access to internal electronics through quarter-turn fasteners, top and bottom aluminum die-castings, four vertical extrusions for load support, and a wide range of accessories including doors, bases, shelves and swing frames. It is noted that other test racks of various sizes and intended TMA applications may be utilized according to the present invention.

FIGS. 9A and 9B provide an example embodiment for a front view 900A and a back view 900B, respectively, for a configured test rack system, according to the present invention. Looking first to the front view 900A, a test rack 901A is shown that includes a monitor 912A, a computer 910A, an emergency "off" unit (EMO) 908A, a shelf with a keyboard and mouse 906A, a power controller and distribution unit 904A, and a power supply (PS) drawer 902A that may include an optional power supply unit. Similarly, looking to the back view 900B, a test rack 901B is shown that includes a monitor 912B, a computer 910B, an emergency "off" unit (EMO) 908B, a shelf with a keyboard and mouse 906B, a power controller and distribution unit 904B, and a power supply (PS) drawer 902B that may include an optional power supply unit. As depicted in FIGS. 9A and 9B, the test rack 901 includes a top, bottom and side panels and is mobile, having four wheels connected to the bottom of the test rack 901. The dimensions of the example configured test rack 901, as depicted, are an exterior width of 32.6 inches, a height of 76 inches, and an interior mounting width of 19 inches between interior vertical mounting rails that are designated with elements 914A and 914B, respectively.

FIG. 7 illustrates simplified website flow for user registration, user configuration and purchase of built-to-order custom-engineered software, such as instrument drivers, by a general or Key user over the Internet using an embodiment of category 218 of FIG. 2. In login/registration step 700, a user gains access to the website server by logging-in or registering with a general or Key Account username and password in an appropriate manner, for example, as described for login/registration steps 500 or 601 as described in relation to FIG. 5 or FIG. 6, respectively. Following general login/registration, a general or Key user is given the opportunity to provide information in steps 701, 702 and 704 that will be used to estimate cost in step 706 for a particular software driver system configured to fit specific hardware and desired features as specified by the user. This information will also be used to select and/or configure the specific driver if ordered by the user in step 708. As described elsewhere herein in relation to other embodiments, Key users may be given opportunity to select or otherwise enter customized information according to the privileges assigned to a particular Key user. It will be understood that although listed as separate steps, the information described in relation to steps 701, 702 and 704 may be entered by a customer in a single graphical interface display (e.g., single web page), as well as in multiple or successive displays. Furthermore, it will be understood that steps 701, 702 and 704 are exemplary only, and that each step need not be present or alternatively that provision for selection or specification of additional or different parameters/parameters may be provided if so desired.

In step 701 a user may be provided the opportunity to enter descriptive information about the specific hardware that the desired software driver/s will be configured to operate with. Such information may entered in blanks provide in a graphical interface and may include, for example, an equipment name (e.g., HP34401A, TEK2470A, etc.), equipment description corresponding to the equipment name (e.g., digital multimeter, oscilloscope, etc.). Instrument interface (e.g., TCP/IP, IEEE-488, RS-232, etc.) and operating system ("O/S") may be selected in step 701, for example from a list in a pull-down menu. In step 702, quantitative information about the command set may be entered in blanks (e.g., number of commands with no parameters, number of commands with parameters, query commands returning single value, query commands returning multiple values, total parameter count, etc.).

In step 704, a user may specify a desired driver package type or driver performance level, for example, that best fits the particular needs and/or budget of the individual user. This selection may be made, for example, by selecting and clicking from three listed driver package types: Basic, Full and Professional. A Basic driver package may be configured to offer the lowest-cost driver package that fits the users minimum needs based on the specific hardware and software information provided in steps 701 and 702. Such a package may be desirable, for example, for use with standardized hardware and software, such as for internal use by a corporation or company user. A Full package may be configured to offer a cost effective intermediate level driver package, for example, for use with a limited range of common hardware and/or software interface types, and may therefore be suitable for distribution by a user to its customers. Professional packages may be offered as high quality driver packages configured and tested for use with several programming platforms, and thus suitable as distribution software by instrument manufacturers. Professional packages configured to allow further flexibility and interchangeability with various hardware components, such as VXI Plug & Play and IVI standards may also be offered as specific options.

Upon completion of steps 701, 702 and/or 704, a user may proceed to step 706 to obtain a price quote on the user-defined driver or driver system and, if desired, may proceed to check-out step 708 to purchase the driver system. Generation of price quote and purchase of the test rack system may be accomplished by interaction between a user and a network server as described elsewhere herein. In one exemplary embodiment, a driver price may be calculated or estimated based only on quantitative information provided about the command set (e.g., number of commands of the specified instrument, number of parameters of the instrument) and the selected instrument driver package type, the additional information specified being used to facilitate engineering and/or configuration of the specific driver following purchase in step 708 by a user.

Pricing of a custom engineered and configured driver according to the embodiment illustrated in FIG. 7 may be performed using any suitable formula or algorithm that takes into account estimated engineering service cost (e.g., services such as driver design, driver development and manual test, regression test and validation test plan generation, range and error handling validation, windows help file and installer generation, etc.), pre-configured software cost, business expenses (such as overhead), profit margin, estimated development time, etc. This may be done, for example, using an algorithm such as described below in relation to FIG. 8. Once ordered, the custom-specified software driver is engineered using the information and specifications provided by the user, tested and delivered to the customer.

Delivery date may optionally be calculated and provided for a custom engineered and configured driver according to the embodiment illustrated in FIG. 7 using a formula that considers, for example, current engineering load, delivery/development time for pre-configured software, complexity of instrument, etc. This may be done, for example, using an algorithm such as described below in relation to FIG. 8.

FIG. 8 is a simplified representation of an algorithm that may be employed in one exemplary embodiment to calculate an engineering service price quote and/or estimated delivery time for an assembled integrated system which requires at least some custom engineering services. Although described with reference to the built-to-order custom-engineered software embodiment of FIG. 7, it will be understood that a similar methodology may be employed for any type of custom engineered services employed, for example, in relation to hardware and/or software engineering performed in conjunction with categories 204 and 206 illustrated in FIG. 2. In FIG. 8, a set of engineering service inputs A–E 800, each representing a respective user-specified piece of information (e.g., number of commands, number of parameters, a selected feature, a selected function, etc.) is established based on user-specified information. Each of the inputs 800 is multiplied by a respective engineering service factor 802 that is pre-determined based on estimated per unit engineering time (e.g., number of hours per command/parameter, or for a given feature or function) for the type of engineering service represented by each input 800. For example, an input A representing the number of commands specified by a user may be multiplied by a predetermined engineering service factor A for command number.

Still referring to FIG. 8, the individual products of each input 800 and each engineering service factor 802 are then added together to give a sum 803. Sum 803 may then be multiplied by a predetermined system type factor to obtain estimated total engineering hours 810. System type factors may be based on the type of system selected by the user. In the illustrated embodiment, system type factors 804, 806 and 808 correspond to the driver package type or driver performance level described in relation to step 704 of FIG. 7, and each may have a value representing the relative complexity of the engineering required to design the selected system type. Total engineering hours 810 may the be multiplied by a pre-determined administrative factor 812 to obtain an adjusted total of engineering hours that accounts, for example, for overhead and management associated with engineering services, etc. Adjusted total of engineering hours obtained in 812 are then multiplied by a pre-determined hourly engineering rate 814 (e.g., dollars per hour) to obtain a total estimated engineering cost including profit margin. The total estimated engineering cost determined in 814 may then be adjusted by multiplication with a feedback factor 816 to give total engineering service price 818. Feedback factor 816 may be automatically determined and updated by server 102 based on a historical or empirical comparison between estimated engineering service cost and actual completed engineering service cost, and used to obtain a more accurate total engineering service price based on historical cost.

FIG. 8 also illustrates that engineering service delivery time 822 may be estimated by adjusting total engineering hours 810 with an additive or multiplicative work load factor 820 that represents anticipated engineering delay time based on current workload. This factor may be, for example, manually estimated and entered. However, automatic calculation and/or entry is also possible.

It will be understood that FIG. 8 is exemplary only, and represents just one possible way in which engineering service price and/or delivery time may be estimated for custom engineered software. It will be understood with benefit of this disclosure that a fewer number of factors, greater number of factors and/or that other or alternative factors may be employed. Furthermore, such factors may be manually or automatically generated and/or entered into a database as so desired. In addition, any alternative type of algorithm or cost/time estimation methodology suitable for estimating engineering service price and/or time may be employed. In the case of customer engineered hardware, additional factors taking into account materials delivery time, manufacturing workload, material costs, etc. may be employed.

As with any of the systems or services embodiments described herein (e.g., categories 202, 204 and 206 of FIG. 2), an adaptive feedback formula may be employed for calculation of price (in this case, driver price) and/or delivery time. Actual development time and/or cost of each driver may be entered in the program upon completion of each driver, and the program allowed to adapt or adjust itself according to the new data, and prior to calculating price quote and/or delivery time for the next ordered driver.

Furthermore, testing of an ordered and completed instrument driver may be accomplished using an automatically generated recursive test program that includes a test certificate, and which is generated by a utility linked to the website server based upon information input during the configuration steps.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Furthermore, although specific embodiments are described herein in relation to Internet network applications, it will be understood with benefit of this disclosure by those of skill in the art that the disclosed systems and methods may also be utilized with private intranet systems as well as any other computer network systems in which host and user computers, or other arrangements of multiple computers, interface and exchange information. Furthermore, it will be understood that as used herein, the indefinite articles "a" and "an" connote "one or more."

What is claimed is:

1. A method for providing integrated systems for test, measurement and automation (TMA) environments, comprising:
    providing a plurality of selectable configuration options to a user through a network, the selectable configuration options representing features for a TMA system;
    receiving information representing configuration options selected by a user;
    assembling a plurality of TMA components to produce a TMA system that satisfies the user-selected configuration options;
    providing systems integration for the TMA system to produce an integrated TMA system; and
    fulfilling an order for the user-configured TMA system with the integrated TMA system.

2. The method of claim 1, wherein the TMA components comprise hardware components, software components, or a combination of both.

3. The method of claim 1, wherein the plurality of TMA components comprise one or more third party TMA hardware components, one or more third party TMA-related software components, or a combination thereof.

4. The method of claim 1, wherein the providing systems integration step comprises providing hardware development services, software development services, or a combination of both.

5. The method of claim 4, wherein the providing systems integration step comprises developing software drivers for at least one of the TMA components.

6. The method of claim 1, further comprising generating a price for the TMA system based upon the user-selected configuration options prior to the assembling step.

7. The method of claim 6, wherein the generating step comprises automatically calculating the price.

8. The method of claim 7, wherein the generating step utilizes an adaptive formula, the adaptive formula being capable of adapting itself based on the user-selected configuration options.

9. The method of claim 6, wherein the price includes consideration of a cost for the plurality of TMA components and a cost for the systems integration required to produce the integrated TMA system.

10. The method of claim 9, wherein the systems integration comprises developing software for the TMA system, and wherein the generating step comprises determination of a cost for the software development.

11. The method of claim 1, further comprising dynamically creating documentation for the integrated TMA system.

12. The method of claim 1, further comprising dynamically creating an automated test software sequence for the integrated TMA system.

13. The method of claim 1, further comprising dynamically creating a test plan for the configured TMA system.

14. The method of claim 1, further comprising dynamically creating assembly diagrams for the integrated TMA system prior to the assembling step.

15. The method of claim 1, wherein the network is the Internet.

16. The method of claim 1, further comprising tracking the status of assembly and fulfillment, and making the status available to the user.

17. The method of claim 16, wherein the tracking status is automatically provided.

18. The method of claim 17, wherein the assembly and fulfillment is performed by two or more respective departments in at least first and second successive steps, and further comprising automatically notifying a first department responsible for the first step following receipt of the order; and automatically notifying a second department responsible for the second step of the completion of the first step or of the estimated completion time for the first step.

19. The method of claim 1, wherein the selectable configuration options comprise one or more pre-determined TMA system configurations, one or more pre-determined TMA components, one or more user-definable TMA components, one or more user-definable TMA system features, or a mixture thereof.

20. The method of claim 1, wherein the plurality of TMA components comprise one or more custom-engineered hardware components, one or more custom-engineered software components, or a combination thereof, and wherein the systems integration comprises the custom-engineering for the custom-engineered hardware or software components.

21. The method of claim 1, further comprising determining an estimated completion date for the integrated TMA system based on the user-selected configuration options, and providing the integrated TMA system estimated completion date to the user.

22. The method of 21, wherein the estimated completion date is determined using an adaptive formula, the adaptive formula being capable of adapting itself based on historical completion times for previously assembled and fulfilled integrated TMA systems.

23. The method of claim 1, further comprising generating a graphical depiction of the integrated TMA system based on the user-selected configuration options, and providing the graphical depiction to the user.

24. The method of claim 23, wherein at least a front view and a back view for the integrated TMA system are viewable by the user.

25. The method of claim 24, wherein the graphical depiction may be rotated around an axis.

26. The method of claim 25, wherein the axis is selectable by the user.

27. The method of claim 23, further comprising:
providing a graphical interface to allow the user to configure the integrated TMA system, the graphical interface having a first area for displaying a graphical representation of an integrated TMA system, and a second area for displaying the selectable configuration options, wherein at least one individual option is capable of user selection from the second area by positioning and clicking of a mouse pointer over the individual option and dragging the individual option into the first area of the graphical interface; and dynamically generating and updating the depiction of the integrated TMA system in the first area of the graphical interface in response to the user selection of selectable configuration options.

28. The method of claim 1, further comprising automatically and dynamically generating integrated system drawings for the integrated TMA system based on the user-selected configuration options.

29. The method of claim 1, further comprising automatically generating assembly information for use in assembly of the integrated TMA system, the assembly information based on the user-selected configuration options, and comprising at least one of a bill of materials, assembly drawings, electrical interconnect drawings, assembly instructions, or a combination thereof.

30. The method of claim 29, further comprising automatically transmitting the assembly information to a manufacturing department for use in assembly of the integrated TMA system.

31. A method for providing through a network cost information for integrated systems within test, measurement and automation (TMA) environments, comprising:
providing a plurality of selectable configuration options to a user through a network, the selectable configuration options representing features for a TMA system;

receiving information representing configuration options selected by a user;

identifying a plurality of TMA components for a TMA system that would satisfy the user-selected configuration options;

determining systems integration that would be required to satisfy the user-selected configuration options;

generating a price for the integrated TMA system, the price including a cost for the plurality of TMA components and a cost for the systems integration required to produce the integrated TMA system; and providing the price to the user through the network.

32. The method of 31, further comprising receiving an order for the integrated TMA system, and fulfilling the order with an integrated TMA system configured and built to meet the user-selected configuration options.

33. The method of claim 31, wherein the plurality of TMA components comprise hardware components, software components, or a combination of both.

34. The method of claim 31, wherein the plurality of TMA components comprise one or more third party hardware components, one or more third party TMA-related software components, or a combination thereof.

35. The method of claim 31, further comprising providing order status tracking information to the user through the network.

36. The method of claim 31, wherein the network is the Internet.

37. The method of claim 31, wherein the price for the integrated TMA system is determined based on the user-selected configuration options and one or more cost factors comprising at least one of a cost of materials to be used to assemble the integrated TMA system, a cost of software used to be used to assemble the integrated TMA system, a cost for assembly of the individual system components to form the integrated TMA system, a cost for engineering services related to configuration or assembly of the integrated TMA system, or a combination thereof.

38. The method of 31, wherein the integrated TMA system price is determined using an adaptive formula, the adaptive formula capable of adapting itself based on historical cost data for assembly of previously assembled integrated TMA systems.

39. The method of claim 31, wherein the integrated TMA system price is determined automatically based on the user-selected configuration options.

40. The method of claim 31, wherein the identifying step comprises automatically identifying two or more TMA components based upon the user-selected configuration options.

41. The method of claim 31, wherein the selectable configuration options comprise one or more pre-determined TMA system configurations, one or more pre-determined TMA system components, one or more user-definable TMA components, one or more user-definable TMA system features, or a mixture thereof.

42. The method of claim 31, further comprising determining an estimated completion date for the integrated TMA system based on the user-selected configuration options, and providing the estimated completion date to the user.

43. The method of claim 42, further comprising automatically updating the estimated completion date upon a change to any of the user-selected configuration options.

44. The method of claim 31, further comprising generating a graphical depiction of the integrated TMA system based on the user-selected configuration options, and providing the graphical depiction to the user.

45. The method of claim 31, further comprising maintaining a database of TMA component information, and wherein the identifying step comprises retrieving component information from the database.

* * * * *